(12) United States Patent
Bok et al.

(10) Patent No.: US 9,897,753 B2
(45) Date of Patent: Feb. 20, 2018

(54) OPTICAL DEVICE AND METHOD OF MANUFACTURING THE SAME

(71) Applicant: SAMSUNG ELECTRONICS CO., LTD., Suwon-si, Gyeonggi-Do (KR)

(72) Inventors: Jin-Kwon Bok, Suwon-si (KR); Kyoung-Ho Ha, Seoul (KR); Dong-Jae Shin, Seoul (KR); Seong-Gu Kim, Pyeongtaek-si (KR); Kwan-Sik Cho, Hwaseong-si (KR); Beom-Suk Lee, Yongin-si (KR); Jung-Ho Cha, Yongin-si (KR); Hyun-Il Byun, Seongnam-si (KR); Dong-Hyun Kim, Hwaseong-si (KR); Yong-Hwack Shin, Hwaseong-si (KR); Jung-Hye Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/388,951

(22) Filed: Dec. 22, 2016

(65) Prior Publication Data
US 2017/0184786 A1    Jun. 29, 2017

(30) Foreign Application Priority Data
Dec. 23, 2015 (KR) .................. 10-2015-0185091

(51) Int. Cl.
G02B 6/12 (2006.01)
G02B 6/122 (2006.01)
G02B 6/125 (2006.01)
G02B 6/136 (2006.01)

(52) U.S. Cl.
CPC .......... *G02B 6/1228* (2013.01); *G02B 6/125* (2013.01); *G02B 6/136* (2013.01); *G02B 2006/12097* (2013.01)

(58) Field of Classification Search
CPC ..................................................... G02B 6/305
See application file for complete search history.

(56) References Cited

U.S. PATENT DOCUMENTS

| | | |
|---|---|---|
| 5,078,516 A | 1/1992 | Kapon et al. |
| 6,925,216 B2 | 8/2005 | Vernon et al. |
| 6,990,257 B2 | 1/2006 | Gunn, III et al. |
| 7,778,504 B2 | 8/2010 | Watanabe et al. |
| 7,927,979 B2 | 4/2011 | Hill et al. |
| 7,941,023 B2 | 5/2011 | Patel et al. |
| 8,791,405 B2 | 7/2014 | Ji et al. |
| 9,076,902 B2 | 7/2015 | Liu |
| 2011/0133063 A1* | 6/2011 | Ji ........................ G02B 6/122 250/227.24 |

FOREIGN PATENT DOCUMENTS

| | | |
|---|---|---|
| JP | 2014-192472 | 10/2014 |
| KR | 1020110062393 | 6/2011 |

* cited by examiner

*Primary Examiner* — Jerry Rahll
(74) *Attorney, Agent, or Firm* — Volentine & Whitt, PLLC

(57) ABSTRACT

An optical device includes a substrate; a trench in a portion of the substrate; a clad layer arranged in the trench; a first structure arranged on the clad layer to have a first depth; and a second structure arranged on the clad layer to have a second depth different from the first depth.

19 Claims, 51 Drawing Sheets

OPTICAL DEVICE AND METHOD OF MANUFACTURING THE SAME

CROSS-REFERENCE TO RELATED APPLICATION

This application claims the benefit of priority under 35 U.S.C. § 119 to Korean Patent Application No. 10-2015-0185091, filed on Dec. 23, 2015, in the Korean Intellectual Property Office, the disclosure of which is incorporated herein in its entirety by reference.

BACKGROUND

Field of the Disclosure

The present disclosure relates to an optical device and a method of manufacturing the same. More particularly, the present disclosure relates to an optical device that includes optical structures having different depths, and a method of manufacturing the same.

Background Information

Due to demand for high speed semiconductor devices, optical devices are employed by integrated circuits. An optical device is fabricated using a silicon on insulator (SOI) substrate. In other words, a silicon oxide layer of a silicon on insulator substrate may function as a lower cladding layer, whereas a monocrystalline silicon layer of the silicon on insulator substrate may be etched to a desired pattern to function as a core layer. Therefore, optical devices have relatively simple structures. Recently, demand has arisen for a variety of individual optical devices with varied structures that possess optimized characteristics.

SUMMARY

The present disclosure describes an inexpensive optical device that includes an individual structure with optimal optical transfer characteristics, and a method of manufacturing the same.

According to an aspect of the present disclosure, an optical device includes a substrate; a trench arranged at a portion of the substrate; a clad layer arranged in the trench; a first structure arranged on the clad layer to have a first depth; and a second structure arranged on the clad layer to have a second depth different from the first depth.

According to some embodiments, the optical device may further include a connecting structure that interconnects the first and second structures in a first direction. A length of the first structure extends in the first direction and may be larger than a length of the second structure. Width of the connecting structure, in a direction perpendicular to the first direction, may gradually decrease along the first direction from an end portion connected to the first structure to an end portion connected to the second structure.

According to some embodiments, the first depth may be larger than the second depth, and the connecting structure may have the first depth.

According to some embodiments, an optical transfer structure consisting of the first structure, the connecting structure, and the second structure may include a first layer and a second layer stacked on a portion of the first layer. The first structure may include a first region of the second layer stacked on a first region of the first layer. The connecting structure may include a tapered second region of the second layer stacked on a tapered second region of the first layer. The second structure may include a third region of the first layer.

According to some embodiments, the second region of the first layer may have a trapezoidal shape of which the width gradually decreases as the second region extends along the first direction. The second region of the second layer may have a triangular shape of which the width gradually decreases as the second region extends along the first direction.

According to some embodiments, a first length of the second region of the first layer in the first direction may be smaller than a second length of the second region of the second layer in the first direction.

According to some embodiments, the second region of the second layer may be formed on a portion of the second region of the first layer and a portion of the third region of the first layer.

According to some embodiments, the second layer may include a groove that exposes edge portions of the top surface of the first layer and is arranged around the bottom edge portions of the second layer.

According to some embodiments, the optical device may further include a material layer having a band-like shape that fills the groove and is arranged around the bottom edge portions of the side surfaces of the second layer.

According to some embodiments, the etching selectivity of the material layer may be different from those of materials constituting the first and second layers.

According to some embodiments, the width of the first layer may be larger than the width of the second layer, and the optical device may further include a material layer arranged on an exposed portion of the top surface of the first layer.

According to some embodiments, the first and second structures may be monocrystalline layers.

According to some embodiments, the first structure may be a light coupler, the second structure may be a light waveguide, and the connecting structure may be a structure interconnecting the light coupler and the light waveguide.

According to another aspect of the present disclosure, an optical device includes a substrate; a clad layer arranged in a trench arranged on a portion of the substrate; and an optical transfer structure, which includes a first layer arranged on the clad layer and a second layer stacked on a portion of the first layer, and which extends in a first direction. The first layer includes a first region of which the width gradually decreases as the first region extends along the first direction; and a second region, which is connected to an end portion of the first region having the smallest width and extends and maintain the smallest width. The width of the second layer gradually decreases as the second layer extends along the first direction. The top surface of the second layer has a triangular shape.

According to some embodiments, the second layer may be arranged on a portion of the first region and a portion of the second region.

BRIEF DESCRIPTION OF THE DRAWINGS

Embodiments of the present disclosure will be more clearly understood from the following detailed description taken in conjunction with the accompanying drawings in which.

DETAILED DESCRIPTION OF THE EMBODIMENTS

Figure 1A:
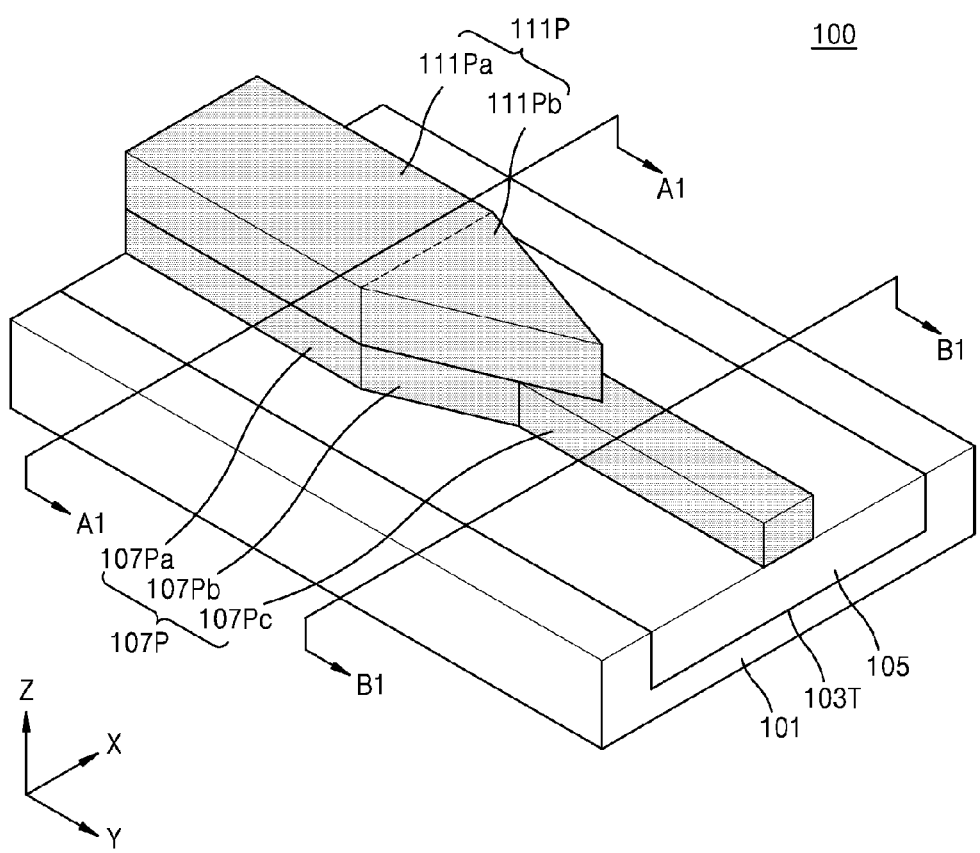
FIGS. 1A through 1C are respectively a perspective view, a cross-sectional view, and a plan view of an optical device according to embodiments of the present disclosure, where FIG. 1B corresponds to a cross-section along a line A1-A1 and a cross-section along a line B1-B1 of FIG. 1A.

As used herein, the term "and/or" includes any and all combinations of one or more of the associated listed items. Expressions such as "at least one of," when preceding a list of elements, modify the entire list of elements and do not modify the individual elements of the list.

Embodiments of the present disclosure will now be described more fully with reference to the accompanying drawings, in which aspects of the exemplary embodiments are shown. Teachings of the present disclosure may, however, be embodied in many different forms and should not be construed as being limited to the embodiments set forth herein; rather, these embodiments are provided so that this disclosure will be thorough and complete, and will fully convey the concepts of the present disclosure to those skilled in the art. In the drawings, the depths (thicknesses) of layers and regions are exaggerated for clarity.

It will be understood that when a layer, region, or component is referred to as being "on" another layer, region, or component, it can be directly or indirectly on the other layer, region, or component. That is, for example, intervening layers, regions, or components may be present.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to the attached drawings.

Figure 1B:
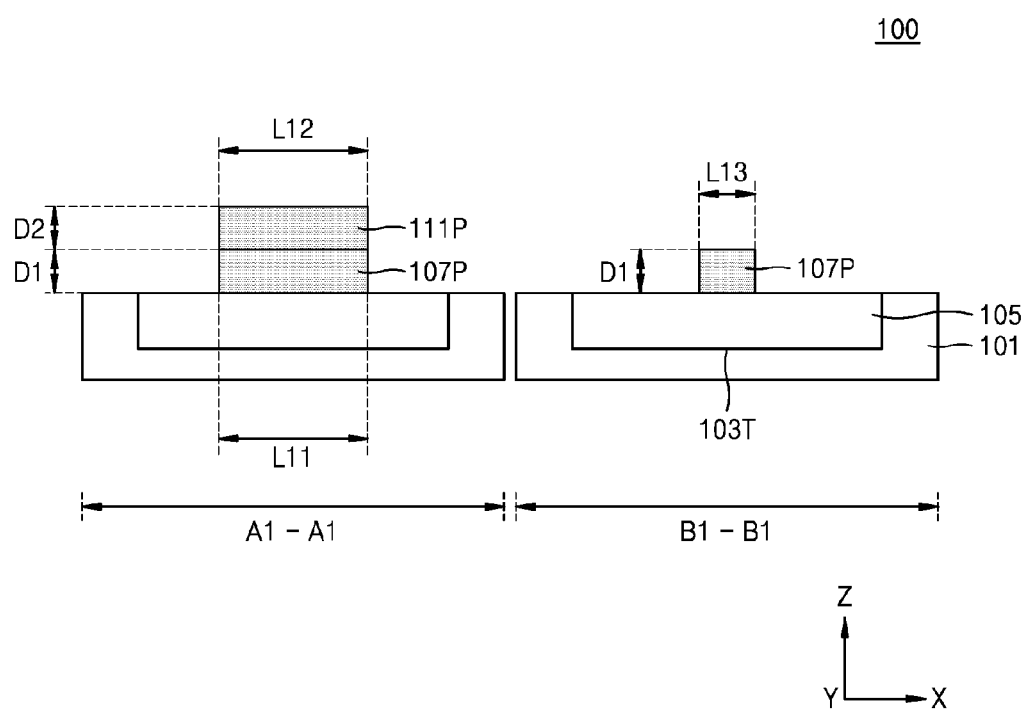
Figure 1C:
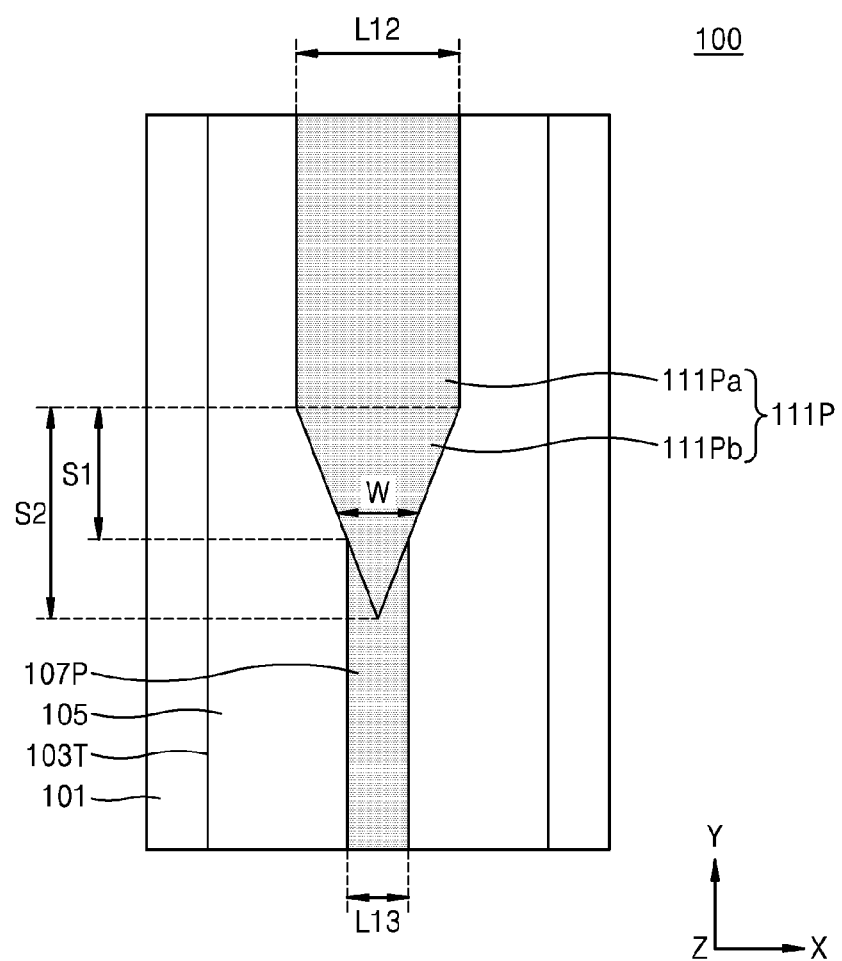

FIGS. 1A through 1C are respectively a perspective view, a cross-sectional view, and a plan view of an optical device 100 according to embodiments of the present disclosure. FIG. 1B corresponds to a cross-section along a line A1-A1 and a cross-section along a line B1-B1 of FIG. 1A.

Referring to FIGS. 1A through 1C, the optical device 100 may include a substrate 101, a trench 103T in a portion of the substrate 101, and a clad layer 105 inside the trench 103T.

The substrate 101 may be a bulk silicon wafer, where the trench 103T may be in the substrate 101 by selectively etching the substrate 101. The clad layer 105 may be arranged in the trench 103T. The clad layer 105 may completely fill the trench 103T.

Optical transfer structures including a first layer 107P and a second layer 111P on a portion of the first layer 107P may be arranged on the trench 103T. The optical transfer structures may extend in a first direction (the y-axis direction).

The optical transfer structures may include monocrystalline silicon having a refraction index higher than that of the clad layer 105. The clad layer 105 may include a silicon oxide (SiO) layer, a silicon oxynitride (SiON) layer, or a silicon nitride (SiNx) layer having a refraction index lower than those of monocrystalline silicon layers constituting the optical transfer structures. Side surfaces and top surfaces of the optical transfer structures may be exposed to an air layer having a refraction index lower than those of monocrystalline silicon layers constituting the optical transfer structures.

Although not shown, an upper clad layer covering the side surfaces and the top surfaces of the optical transfer structures may be arranged. The upper clad layer may include a material having a refraction index lower than those of monocrystalline silicon layers constituting the optical transfer structures.

In the present disclosure, and unless indicated to the contrary, depth or thickness is consistently used to refer to a measure in the (second) Z direction as shown in the Figures. Length is consistently used to refer to a measure in the (first) Y direction shown in the Figures, perpendicular to the Z direction. Width is consistently used to refer to a measure in the (third) X direction shown in the Figures, perpendicular to the Z and Y directions.

The optical transfer structures provide a path via which light is transferred. Light may be transferred in the first direction (the y-axis direction) in which the optical transfer structures extend. The optical transfer structures may be arranged at the center portion of the clad layer 105 to avoid optical interference of other components, but the present disclosure is not limited thereto.

The first layer 107P may include first, second, and third regions 107Pa, 107Pb, and 107Pc. The first region 107Pa of the first layer 107P may have a constant first width L11 and may extend along the (length) in the first direction (the y-axis direction). The second region 107Pb of the first layer 107P may be connected to the first region 107Pa, and may have a width (i.e., in the third direction) that gradually narrows from the first width L11 as the second region 107Pb extends along the (length) in the first direction (the y-axis direction). Therefore, the second region 107Pb of the first layer 107P may have a trapezoidal shape. The third region 107Pc of the first layer 107P may be connected to an end portion of the second region 107Pb that has the smallest width, that is, a third width L13, and may maintain the third width L13 constantly as the third region 107Pc extends along the (length) in the first direction.

The terms "gradually narrow" or "gradually decrease" as used with respect to a width herein may be interpreted as meaning that a width in, for example, an x direction, along a length of a structure in the (first) y direction. Widths may decrease linearly as shown in FIG. 1, and a gradual angle of decrease for these widths in an XY plane is typically less than 45 degrees, and may even be lower than, for example, 30 degrees.

The second layer 111P may include first and second regions 111Pa and 111Pb. The first region 111Pa of the second layer 111P may have a constant second width L12 and may extend along the (length) in the first direction (the y-axis direction). The second region 111Pb of the second layer 111P may be connected to an end portion of the first region 111Pa that has the second width L12, and may have a gradually decreasing width (i.e., in the third direction) as the second region extends along the (length) in the first direction (the y-axis direction). Here, the top surface of the second region 111Pb of the second layer 111P may have a triangular shape.

As described above, the optical transfer structures may be split into the first layer 107P and the second layer 111P in a second direction (the z-axis direction) perpendicular to the substrate 101. However, due to a difference between lengths of the optical transfer structures in the first direction (the y-axis direction), the optical transfer structures may be split into first structures (111Pa, 107Pa), connecting structures (111Pb, 107Pb), and a second structure (107Pc). In this case, the first structures (111Pa, 107Pa), the connecting structures (111Pb, 107Pb), and the second structure may have different lengths from one another. In other words, the first structures (111Pa, 107Pa), the connecting structures (111Pb, 107Pb), and the second structure may have shapes for improving light transfer efficiency by taking characteristics of the individual structures into account.

The first structures (111Pa, 107Pa) may have a structure in which the first region 107Pa of the first layer 107P and the first region 111Pa of the second layer 111P are stacked. Therefore, the first structures (111Pa, 107Pa) may have depths D1 and D2 (i.e., in the second direction), which is a sum of a first depth D1 of the first layer 107P and a second depth D2 of the second layer 111P. Furthermore, the width of the first structures may be greater than the width of the second structure.

In other words, the first structures (111Pa, 107Pa) may have the largest depth D1 and D2 and the largest first width L11. Therefore, a cross-section (XZ plane) of the first structures (111Pa, 107Pa) may be the largest cross-section (XZ plane) of the optical transfer structures.

The connecting structures (111Pb, 107Pb) connected to the first structures may have a structure in which the second region 107Pb of the first layer 107P and the second region 111Pb of the second layer 111P are stacked. Therefore, the connecting structures (111Pb, 107Pb) may have depths D1 and D2, which is a sum of a first depth D1 of the first layer 107P and a second depth D2 of the second layer 111P.

The second region 107Pb of the first layer 107P and the second region 111Pb of the second layer 111P may have tapered shapes of which widths W thereof decrease as the second region 107Pb of the first layer 107P and the second region 111Pb of the second layer 111P extend along the first direction (the y-axis direction). For example, the second region 107Pb of the first layer 107P may have a trapezoidal shape of which the width (i.e., in the third direction) gradually decreases as the first layer 107P extends in the first direction (the y-axis direction), whereas the second region 111Pb of the second layer 111P may have a triangular shape of which the width (i.e., in the third direction) gradually decreases as the second region 111P extends in the first direction (the y-axis direction) to a vertex.

The connecting structures (111Pb, 107Pb) may have the same depth D1 and D2 as that of the first structures and may have the width W that gradually decreases below the first width L11 toward an end portion connected to the second structure. In other words, cross-sections (XZ plane) of the connecting structures (111Pb, 107Pb) may become smaller than a cross-section (XZ plane) of the first structures. Therefore, light incident to the connecting structures in the first direction (the y-axis direction) may be compressed while the light travels through the connecting structures. According to some embodiments, a first length S1 of the second region 107Pb of the first layer 107P in the first direction (the y-axis direction) may be less than a second length S2 of the second region 111Pb of the second layer 111P in the first direction (the y-axis direction). Therefore, the second region 111Pb of the second layer 111P may be arranged on a portion of the second region 107Pb of the first layer 107P and a portion of the third region 107Pc of the first layer 107P. A width of the third region 107Pc (i.e., in the third direction) is shown to be smaller than a width of the first region 107Pa. Additionally, a width of the connecting structure 107Pb (i.e., in the third direction) decreases along the first direction (i.e., length) from an end portion connected to the first region 107Pa to an end portion connected to the third region 107Pc.

The second structure connected to the connecting structures may have a structure including the third region 107Pc of the first layer 107P. The second structure may have the same third width L13 as the smallest width of the connecting structures. In other words, a cross-section (XZ plane) of the second structure may be the smallest cross-section among cross-sections (XZ planes) of the optical transfer structures.

Therefore, light travelling through the first structures, the connecting structures (111Pb, 107Pb), and the second structure in the order stated may be compressed in vertical directions and horizontal directions. On the contrary, light travelling through the second structure, the connecting structures, and the first structures in the order stated may be expanded in vertical directions and horizontal directions.

Although FIGS. 1A through 1C show that the first width L11 of the first region 107Pa of the first layer 107P of the first structures is identical to the second width L12 of the first region 111Pa of the second layer 111P, the present disclosure is not limited thereto. In other words, the first width L11 of the first region 107Pa of the first layer 107P may be greater than the second width L12 of the first region 111Pa of the second layer 111P. In the same regard, although FIGS. 1A through 1C show that the width of the second region 107Pb of the first layer 107P of the connecting structures is identical to the width of the second region 111Pb of the second layer 111P, the present disclosure is not limited thereto. Detailed descriptions thereof will be given below with reference to FIGS. 4A through 5C.

According to some embodiments, the first structures may be a light coupler, the second structure may be a light waveguide, and the connecting structures may be a structure interconnecting the light coupler to the light waveguide.

Here, a 'first width' stated in the claims may correspond to a sum of the first depth D1 of the first layer 107P and the second depth D2 of the second layer 111P described above, whereas a 'second width' stated in the claims may correspond to the first depth D1 of the first layer 107P described above.

Figure 2A:
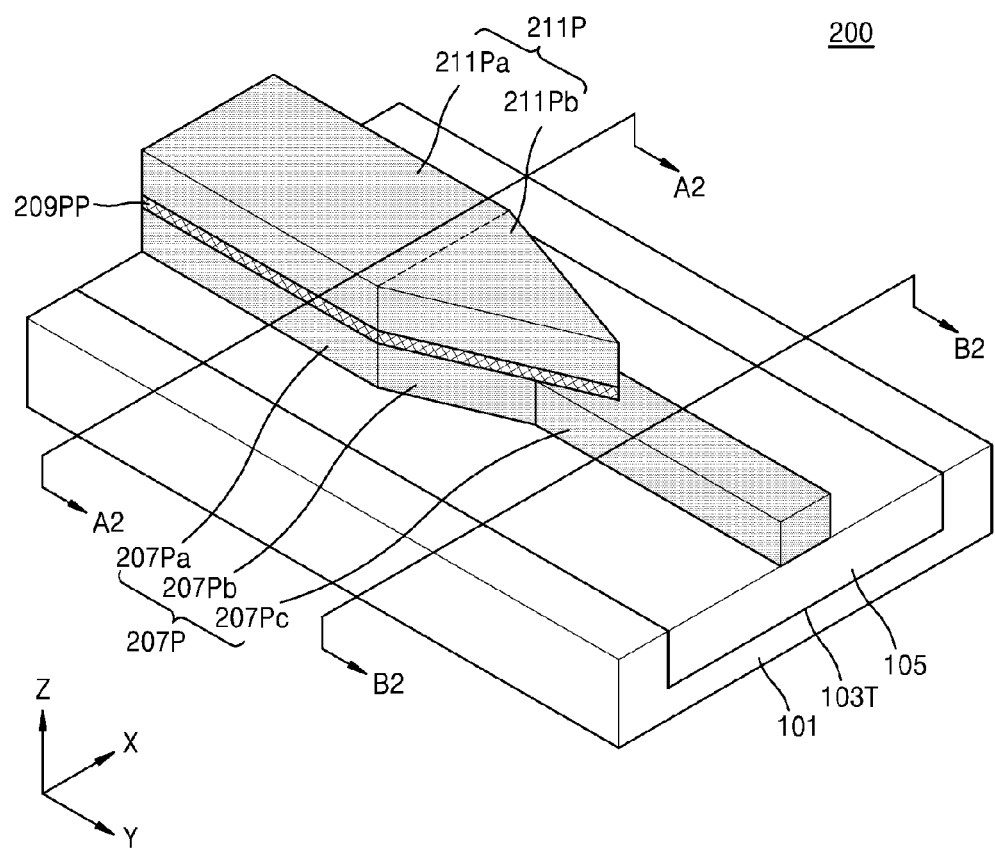
FIGS. 2A and 2B are respectively a perspective view and a cross-sectional view of an optical device according to embodiments of the present disclosure, where FIG. 2B corresponds to a cross-section along a line A2-A2 and a cross-section along a line B2-B2 of FIG. 2A.
Figure 2B:
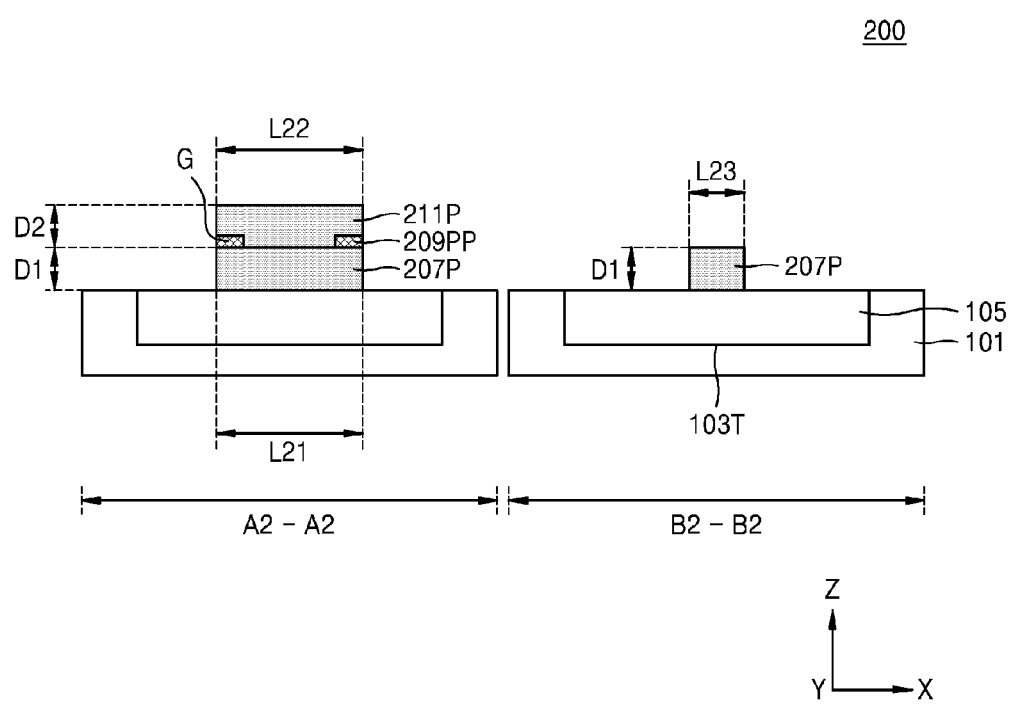

FIGS. 2A and 2B are respectively a perspective view and a cross-sectional view of an optical device 200 according to embodiments of the present disclosure. FIG. 2B corresponds to a cross-section along a line A2-A2 and a cross-section along a line B2-B2 of FIG. 2A. The optical device 200 may be similar to the optical device 100 of FIGS. 1A through 1C, where the shape of a second layer 211P may be different from that of the second layer 111P. Any repeated description will be omitted.

Referring to FIGS. 2A and 2B, the optical device 200 may include a substrate 101, a trench 103T in a portion of the substrate 101, and a clad layer 105 inside the trench 103T.

Optical transfer structures including a first layer 207P and a second layer 211P on a portion of the first layer 207P may be arranged on the trench 103T. Here, the second layer 211P may include a groove G that exposes edge portions of the first layer 207P and is formed along the bottom edge portions of the second layer 211P. Furthermore, the second layer 211P may include a material layer 209PP that fills the groove G and has a band-like shape along the bottom edge portions of the side surfaces of the second layer 211P.

The material layer 209PP may be formed as some of an etch stop pattern, which is arranged on the first layer 207P to prevent the first layer 207P from being etched during an operation for etching the second layer 211P, remains. Therefore, the material layer 209PP may have a different etching selectivity from those of materials constituting the first layer 207P and the second layer 211P. In other words, the first layer 207P and the second layer 211P may be monocrystalline silicon layers, whereas the material layer 209PP may be a silicon oxide (SiO) layer, a silicon oxynitride (SiON) layer, or a silicon nitride (SiN) layer that has a different etching selectivity from that of the monocrystalline silicon layers. Detailed descriptions thereof will be given below in relation to a method of manufacturing the optical device 200 with reference to FIGS. 15A through 20B.

The first layer 207P may include first, second, and third regions 207Pa, 207Pb, and 207Pc. The second layer 211P may include first and second regions 211Pa and 211Pb. Therefore, first structures may have a structure in which the first region 207Pa of the first layer 207P and the first region 211Pa of the second layer 211P are stacked.

Connecting structures may have a structure in which the second region 207Pb of the first layer 207P and the second region 211Pb of the second layer 211P are stacked. A second structure may have a structure including the third region 207Pc of the first layer 207P.

Figure 3A:
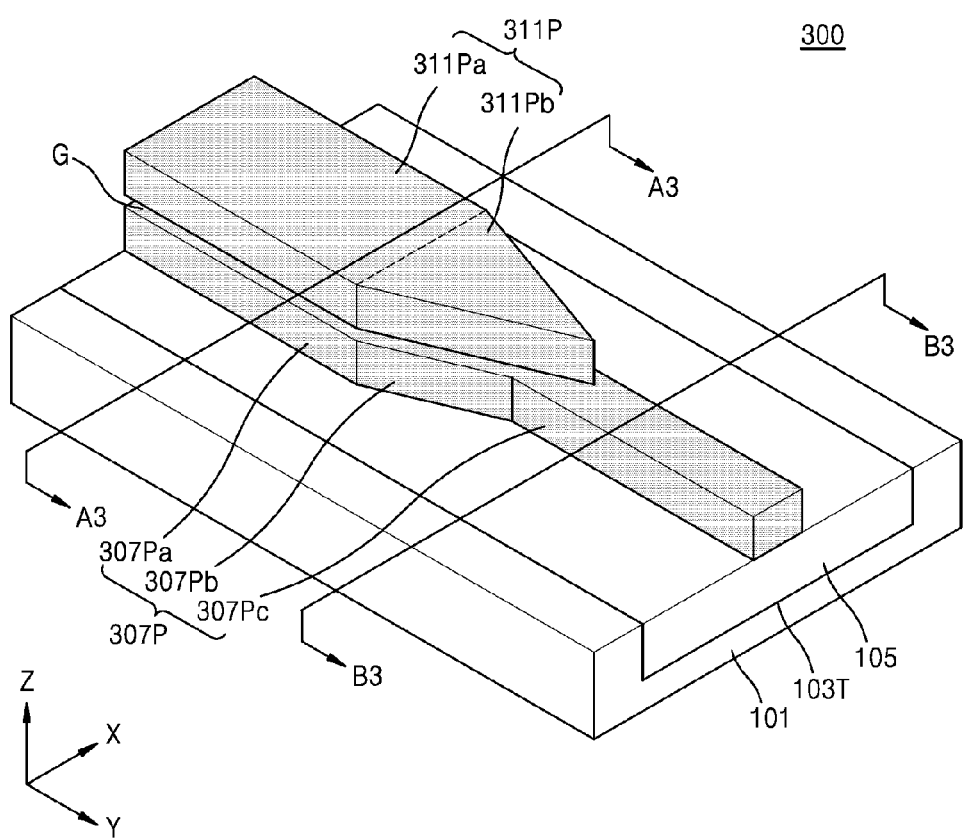
FIGS. 3A and 3B are respectively a perspective view and a cross-sectional view of an optical device according to embodiments of the present disclosure, where FIG. 3B corresponds to a cross-section along a line A3-A3 and a cross-section along a line B3-B3 of FIG. 3A.
Figure 3B:
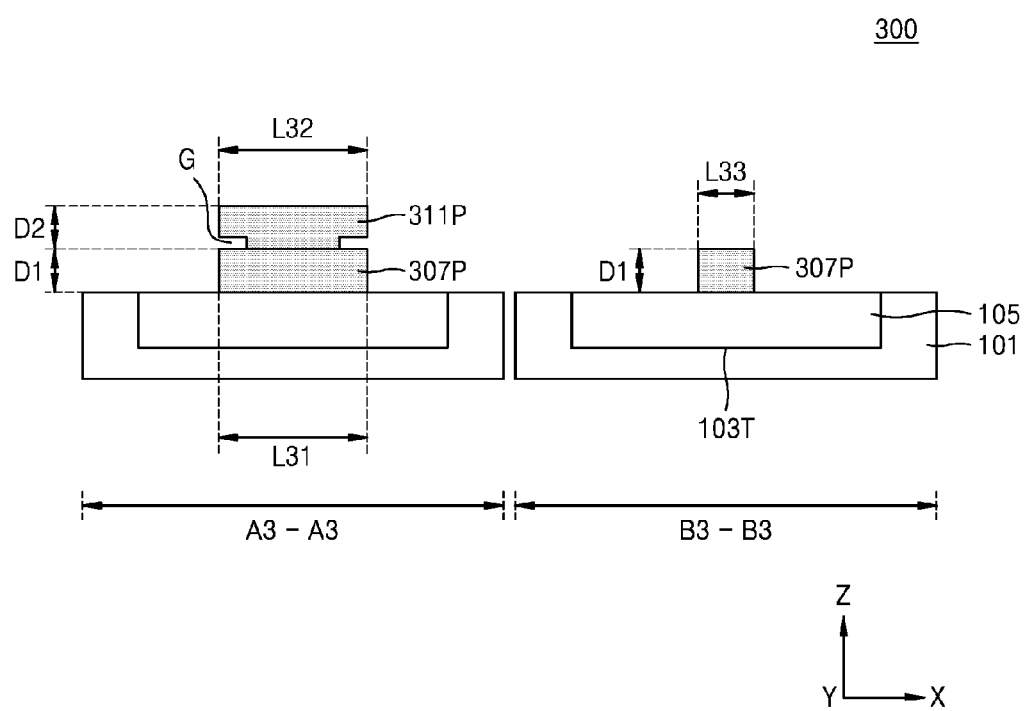

FIGS. 3A and 3B are respectively a perspective view and a cross-sectional view of an optical device 300 according to embodiments of the present disclosure. FIG. 3B corresponds to a cross-section along a line A3-A3 and a cross-section along a line B3-B3 of FIG. 3A. The optical device 300 may be similar to the optical device 200 of FIGS. 2A and 2B except that there is no material layer 209PP in the groove G in the optical device 300.

Referring to FIGS. 3A and 3B, the optical device 300 may include a substrate 101, a trench 103T in a portion of the substrate 101, and a clad layer 105 inside the trench 103T.

Optical transfer structures including a first layer 307P and a second layer 311P on a portion of the first layer 307P may be arranged on the trench 103T. Here, the second layer 311P may include a groove G that exposes edge portions of the first layer 307P and is formed along the bottom edge portions of the second layer 311P.

The groove G may be formed as some of an etch stop pattern, which is arranged on the first layer 307P to prevent the first layer 307P from being etched during an operation for etching the second layer 311P, is removed.

The first layer 307P may include first, second, and third regions 307Pa, 307Pb, and 307Pc. The second layer 311P may include first and second regions 311Pa and 311Pb. Therefore, first structures may have a structure in which the first region 307Pa of the first layer 307P and the first region 311Pa of the second layer 311P are stacked.

Connecting structures may have a structure in which the second region 307Pb of the first layer 307P and the second region 311Pb of the second layer 311P are stacked. A second structure may have a structure including the third region 307Pc of the first layer 307P.

Figure 4A:
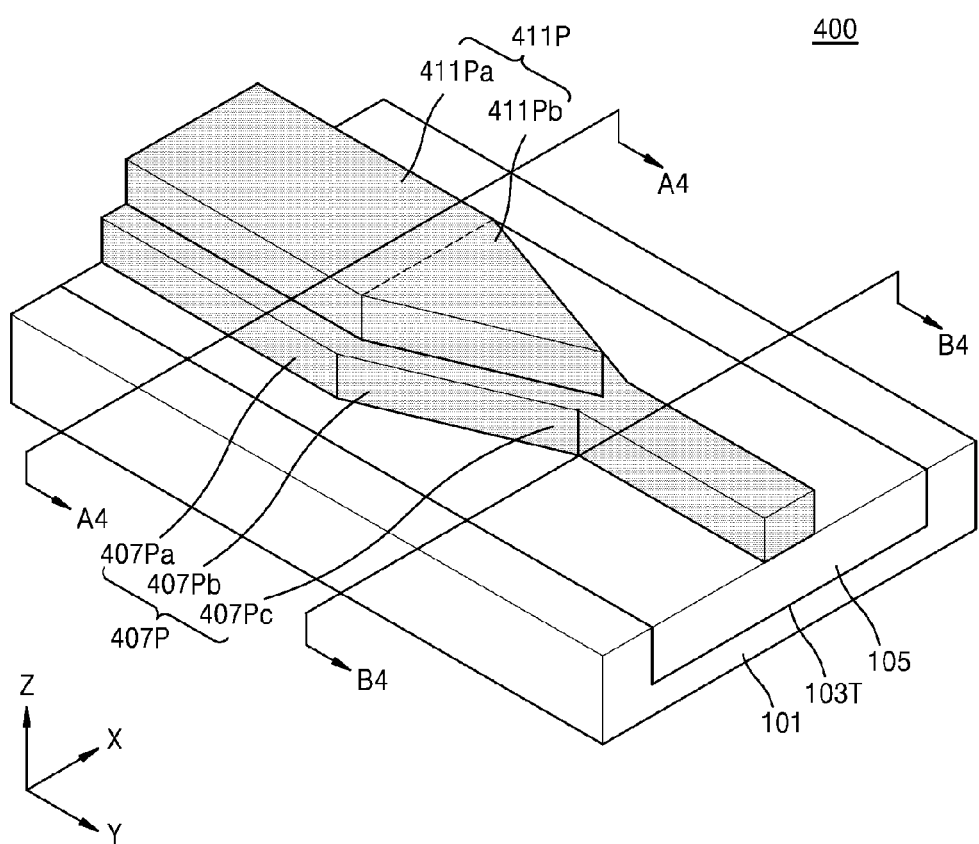
FIGS. 4A through 4C are respectively a perspective view, a cross-sectional view, and a plan view of an optical device according to embodiments of the present disclosure, where FIG. 4B corresponds to a cross-section along a line A4-A4 and a cross-section along a line B4-B4 of FIG. 4A.
Figure 4B:
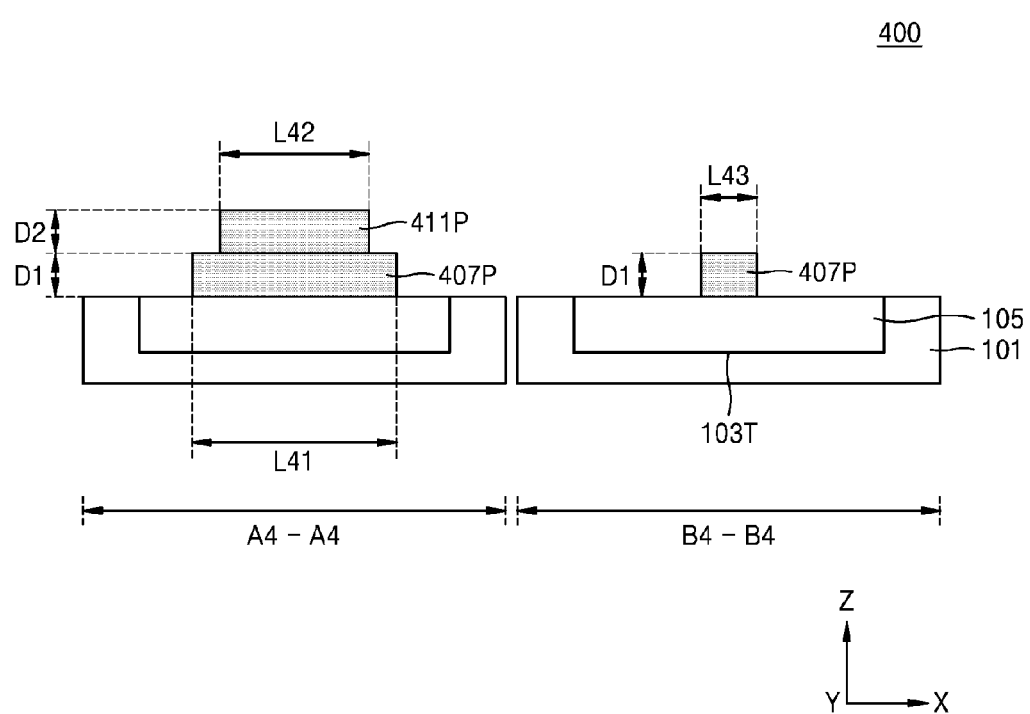
Figure 4C:
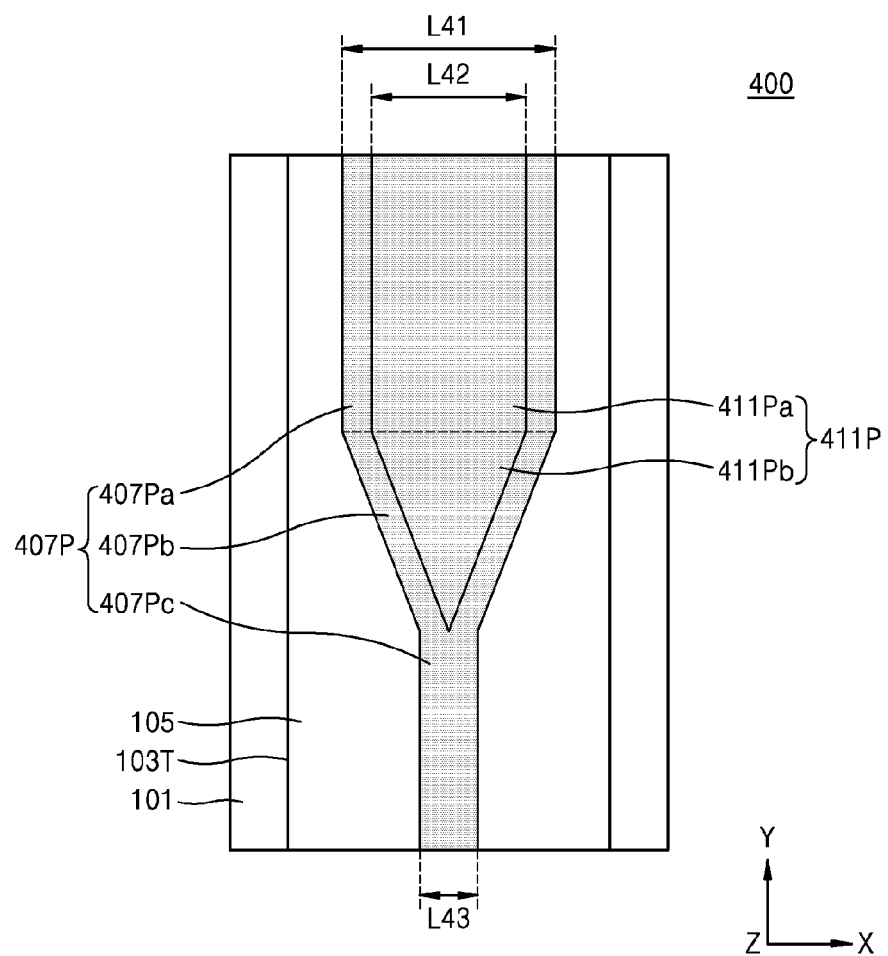

FIGS. 4A through 4C are respectively a perspective view, a cross-sectional view, and a plan view of an optical device 400 according to embodiments of the present disclosure. FIG. 4B corresponds to a cross-section along a line A4-A4 and a cross-section along a line B4-B4 of FIG. 4A. The optical device 400 may be similar to the optical device 100 of FIGS. 1A through 1C except that a width L41 of the first layer 407P is greater than a width L42 of a second layer 411P.

Referring to FIGS. 4A through 4C, the optical device 400 may include a substrate 101, a trench 103T in a portion of the substrate 101, and a clad layer 105 inside the trench 103T. Optical transfer structures including a first layer 407P and a second layer 411P on a portion of the first layer 407P may be arranged on the trench 103T.

The first layer 407P may include first, second, and third regions 407Pa, 407Pb, and 407Pc. The first region 407Pa of the first layer 407P may have a constant first width L41 and may extend in the first direction (the y-axis direction). The second region 407Pb of the first layer 407P may gradually narrow from the first width L41 and may extend in the first direction (the y-axis direction). The third region 407Pc of the first layer 407P may extend and maintain a constant third width L43.

The second layer 411P may include first and second regions 411Pa and 411Pb. The first region 411Pa of the second layer 411P may have a constant second width L42 and may extend in the first direction (the y-axis direction).

Here, a second width of the first region 411Pa may be less than the first width L41 of the first region 407Pa of the first layer 407P. Therefore, steps may be formed at edge portions of the first layer 407P and the second layer 411P. Detailed descriptions thereof will be given below in relation to methods of manufacturing the optical devices 400 and 500 with reference to FIGS. 21A through 22B.

The second region 411Pb of the second layer 411P may gradually narrow and extend in the first direction (the y-axis direction).

The first region 407Pa of the first layer 407P and the first region 411Pa of the second layer 411P may be stacked to constitute first structures. The second region 407Pb of the first layer 407P and the second region 411Pb of the second layer 411P may be stacked to constitute connecting structures. The third region 407Pc of the first layer 407P may be a second structure.

Figure 5A:
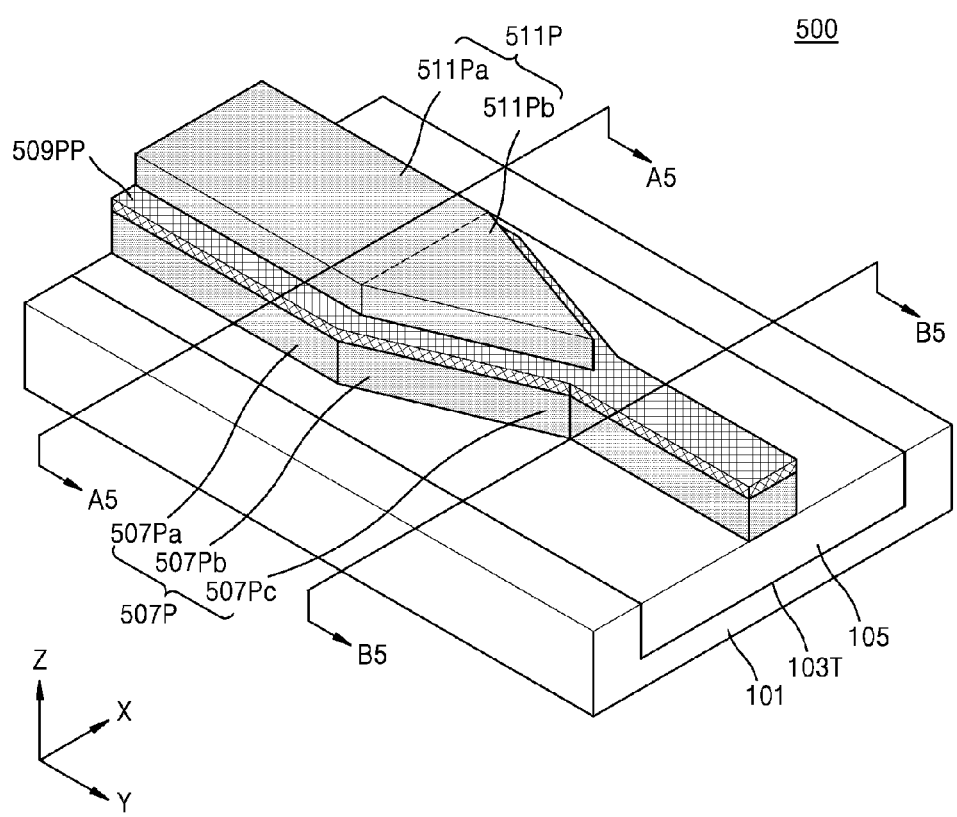
FIGS. 5A through 5C are respectively a perspective view, a cross-sectional view, and a plan view of an optical device according to embodiments of the present disclosure, where FIG. 5B corresponds to a cross-section along a line A5-A5 and a cross-section along a line B5-B5 of FIG. 5A.
Figure 5B:
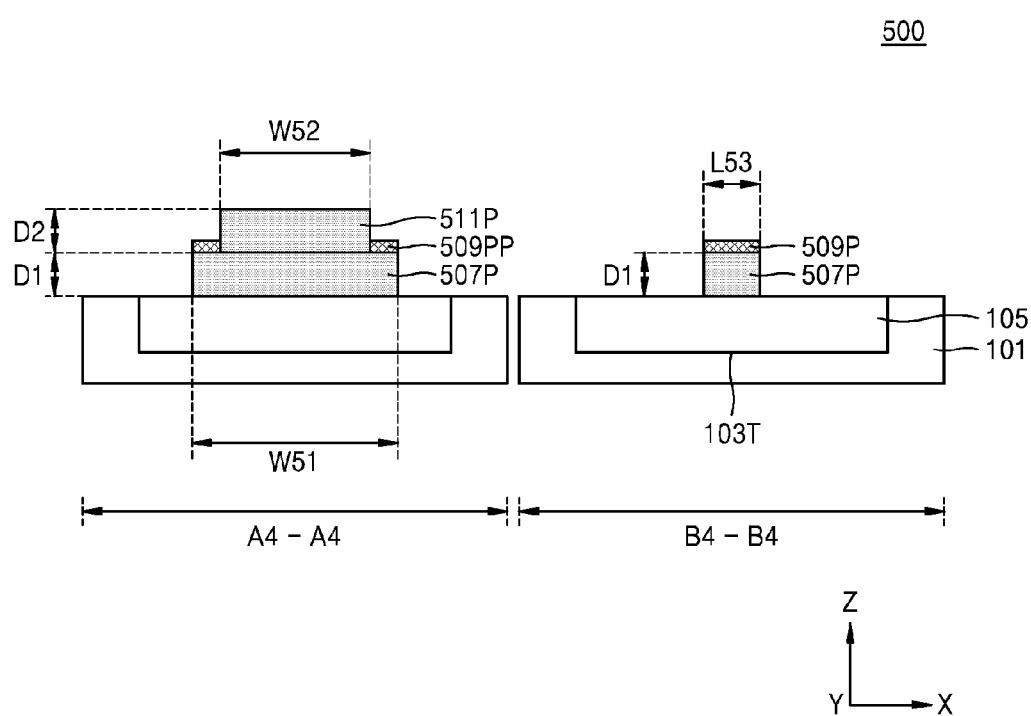
Figure 5C:
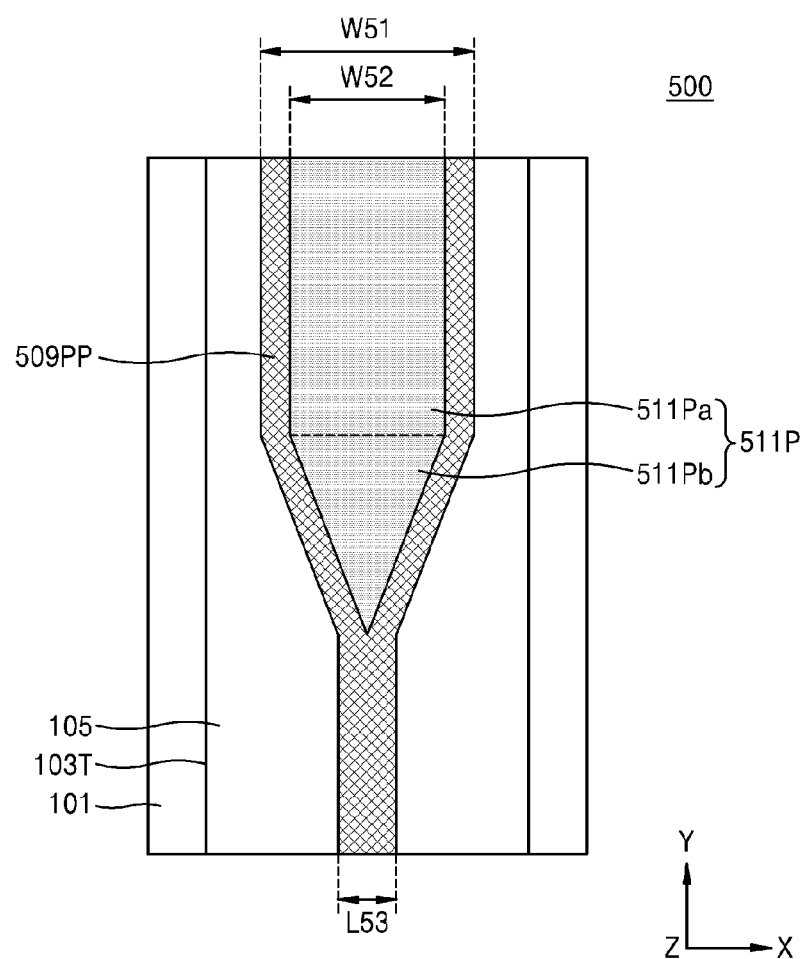

FIGS. 5A through 5C are respectively a perspective view, a cross-sectional view, and a plan view of an optical device 500 according to embodiments of the present disclosure. FIG. 5B corresponds to a cross-section along a line A5-A5 and a cross-section along a line B5-B5 of FIG. 5A. The optical device 500 may be similar to the optical device 400 of FIGS. 4A through 4C except that a material layer 509PP is further arranged on surfaces of a first layer 507P exposed due to a difference between a width L51 of the first layer 507P and a width L52 of a second layer 511P.

Referring to FIGS. 5A through 5C, the optical device 500 may include a substrate 101, a trench 103T in a portion of the substrate 101, and a clad layer 105 inside the trench 103T. Optical transfer structures including a first layer 507P and a second layer 511P on a portion of the first layer 507P may be arranged on the trench 103T.

Here, the width L52 of the second layer 511P may be smaller than the width L51 of the first layer 507P, and thus some of surfaces of the first layer 507P may not overlap the second layer 511P and be exposed. The material layer 509PP may be arranged on the exposed surfaces.

The material layer 509PP may be formed as some of an etch stop pattern, which is arranged on the first layer 507P to prevent the first layer 507P from being etched during an operation for etching the second layer 511P, is removed. Therefore, the material layer 509PP may have a different etching selectivity from those of materials constituting the first layer 507P and the second layer 511P. In other words, the first layer 507P and the second layer 511P may be monocrystalline silicon layers, whereas the material layer 509PP may be a silicon oxide (SiO) layer, a silicon oxynitride (SiON) layer, or a silicon nitride (SiN) layer that has a different etching selectivity from that of the monocrystalline silicon layers. Detailed descriptions thereof will be given below in relation to methods of manufacturing the optical devices 400 and 500 with reference to FIGS. 21A through 22B.

The first layer 507P may include first, second, and third regions 507Pa, 507Pb, and 507Pc. The second layer 511P may include first and second regions 511Pa and 511Pb. Therefore, first structures may have a structure in which the first region 507Pa of the first layer 507P and the first region 511Pa of the second layer 511P are stacked. Connecting structures may have a structure in which the second region 507Pb of the first layer 507P and the second region 511Pb of the second layer 511P are stacked. A second structure may have a structure that includes the third region 507Pc of the first layer 507P.

FIGS. 6A through 14C are perspective diagrams, cross-sectional diagrams, and plan diagrams sequentially showing operations of a method of manufacturing the optical device 100 according to embodiments shown in FIGS. 1A through 1C.

Figure 6A:
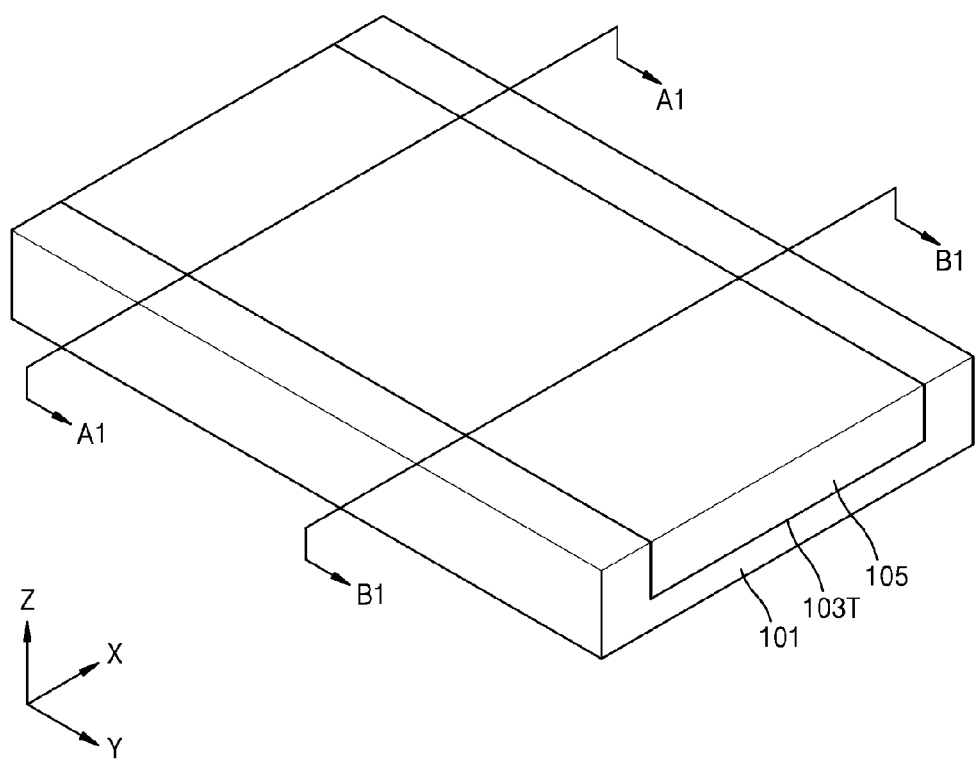
FIGS. 6A through 14C are perspective diagrams, cross-sectional diagrams, and plan diagrams sequentially showing operations of a method of manufacturing the optical device according to embodiments shown in FIGS. 1A through 1C.
Figure 6B:
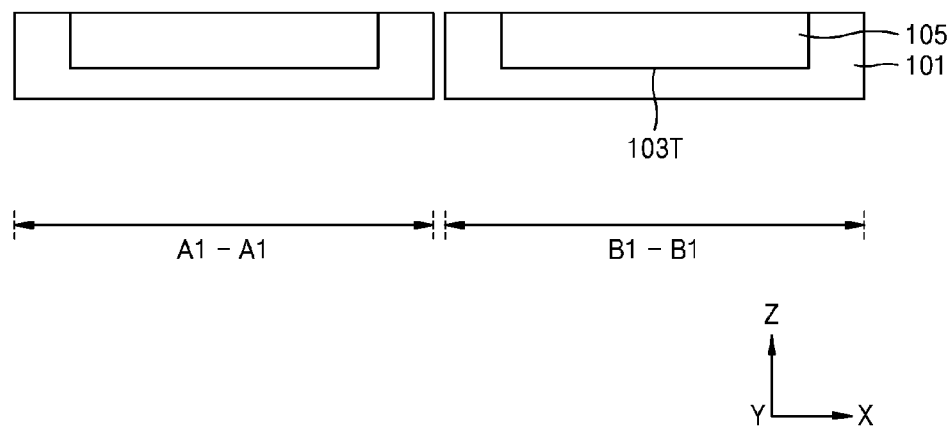

Referring to FIGS. 6A and 6B, the bulk substrate 101 may be prepared. Here, the substrate 101 may be a bulk silicon wafer. The trench 103T may be formed at a portion of the substrate 101 by selectively etching the substrate 101. The depth and width of the trench 103T may become the depth and width of the clad layer 105 formed below the first structures of FIGS. 1A through 1C.

Next, a clad material layer filling the trench 103T may be formed, and the clad layer 105 may be formed by chemically and mechanically polishing the clad material layer. The clad layer 105 includes a material that has a refraction index lower than that of a material constituting the first structures of FIGS. 1A through 1C. For example, the clad layer 105 may include a silicon oxide (SiO) layer, a silicon oxynitride (SiON) layer, or a silicon nitride (SiN) layer.

Figure 7A:
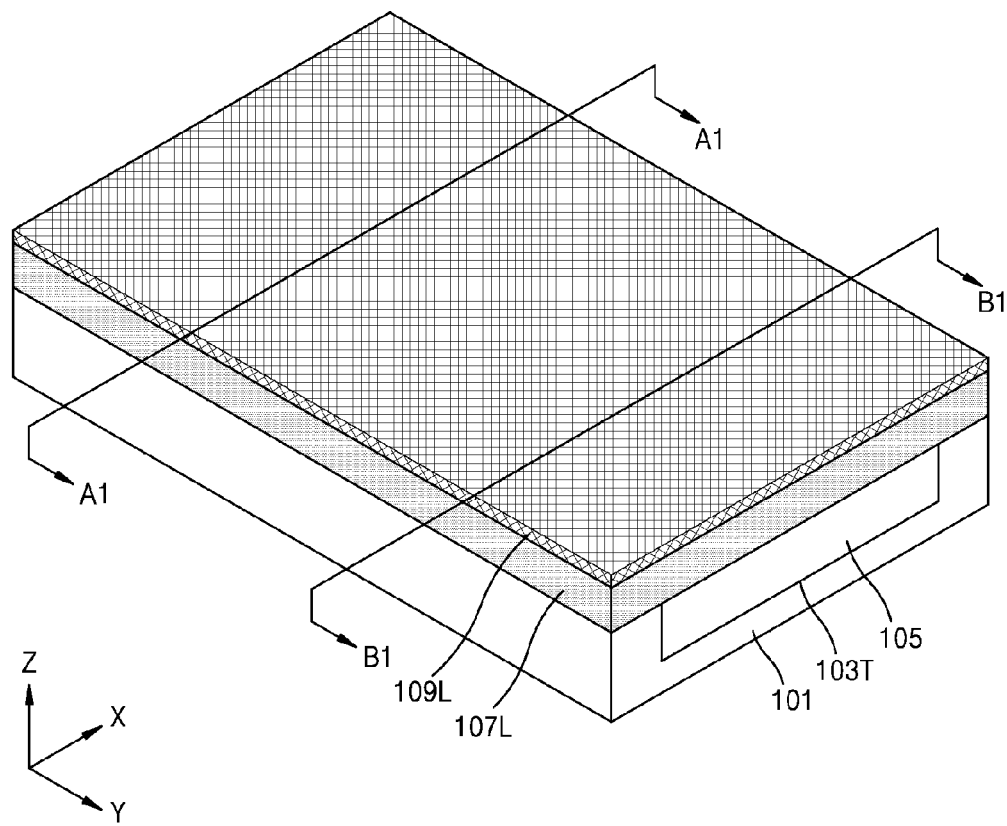
Figure 7B:
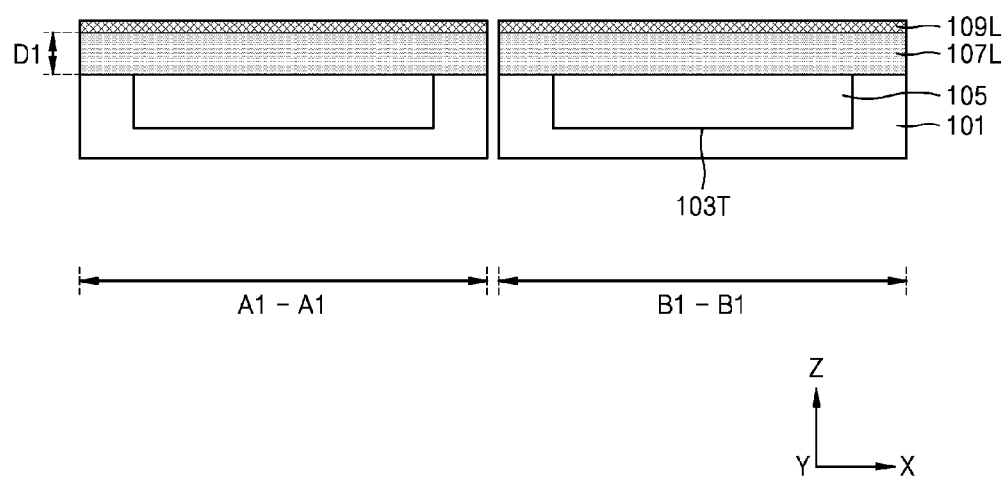

Referring to FIGS. 7A and 7B, a first preparatory layer 107L and an etch stop layer 109L may be sequentially formed over the clad layer 105 and the substrate 101. The first preparatory layer 107L is formed to have a first depth D1 and may be used as the first layer 107P of the first structures of FIGS. 1A through 1C. The first preparatory layer 107L may include an amorphous silicon layer. The first preparatory layer 107L including an amorphous silicon layer may be transformed to a crystalline silicon layer, and more particularly, to a monocrystalline silicon layer in a later crystallizing operation.

The etch stop layer 109L may control a depth of each structure constituting an optical device. Generally, in order to control depth of an individual structure, a time period for performing an etching operation is controlled. In this case, it is difficult to precisely control depth, and thus operation reliability is deteriorated. On the contrary, in a method of manufacturing an optical device according to an embodiment of the present disclosure, by employing the etch stop layer 109L, depth of each individual structure may be precisely controlled while multiple structures having different depths are simultaneously formed. The etch stop layer 109L may be introduced to prevent the first preparatory layer 107L from being additionally etched in order to form a structure having the first depth D1.

The etch stop layer 109L may include a material having an etching selectivity different from that of a second preparatory layer 111L formed on the etch stop layer 109L in a later operation. For example, the first and second preparatory layers 107L and 111L may be silicon layers, whereas the etch stop layer 109L may be a silicon oxide (SiO) layer, a silicon oxynitride (SiON) layer, or a silicon nitride (SiN) layer. However, the present disclosure is not limited thereto.

Figure 8A:
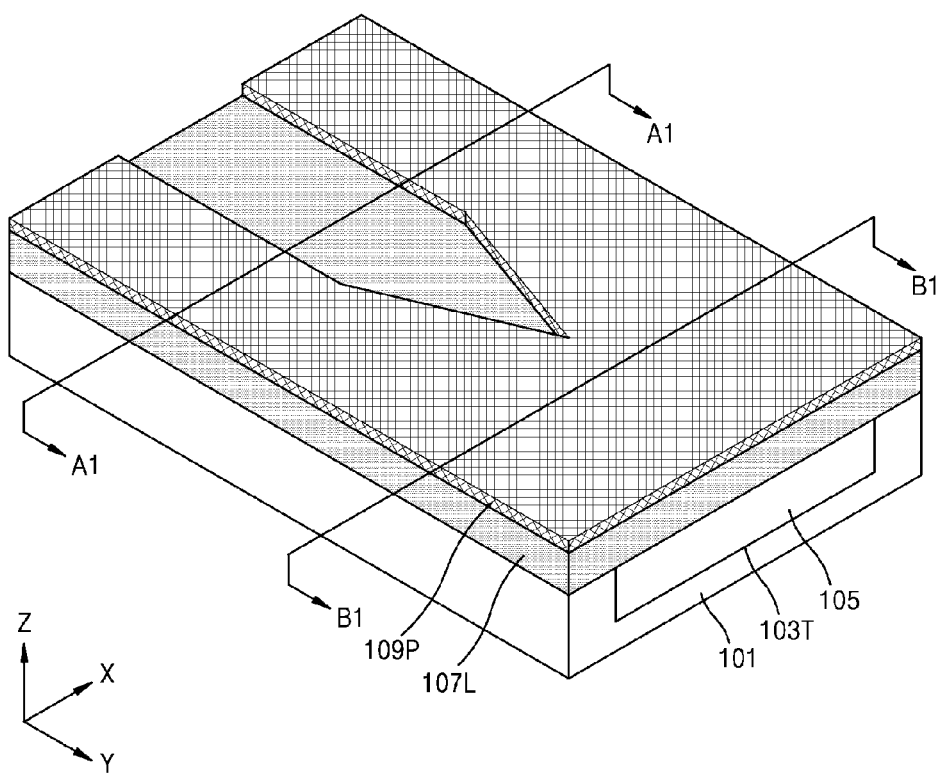
Figure 8B:
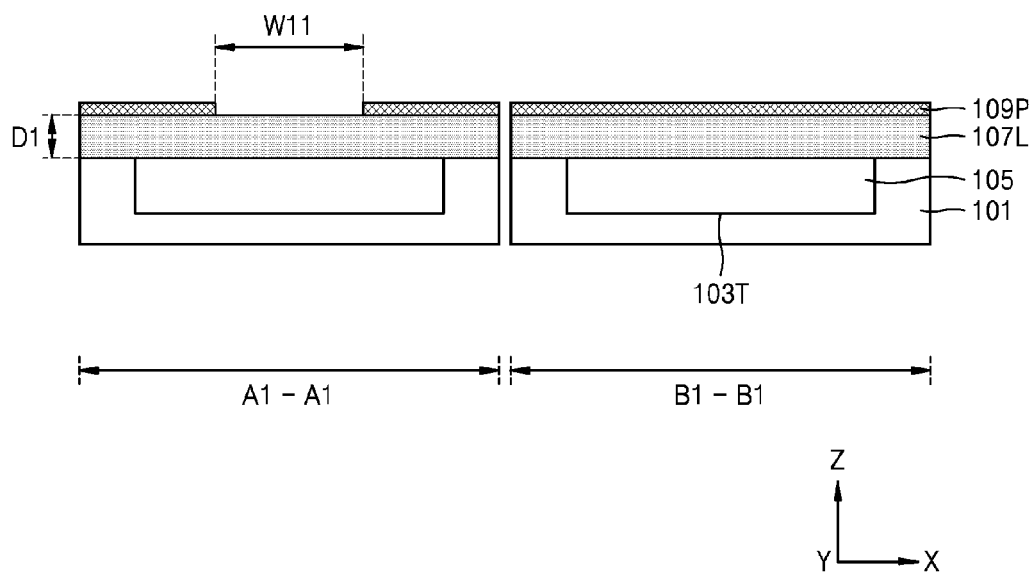
Figure 8C:
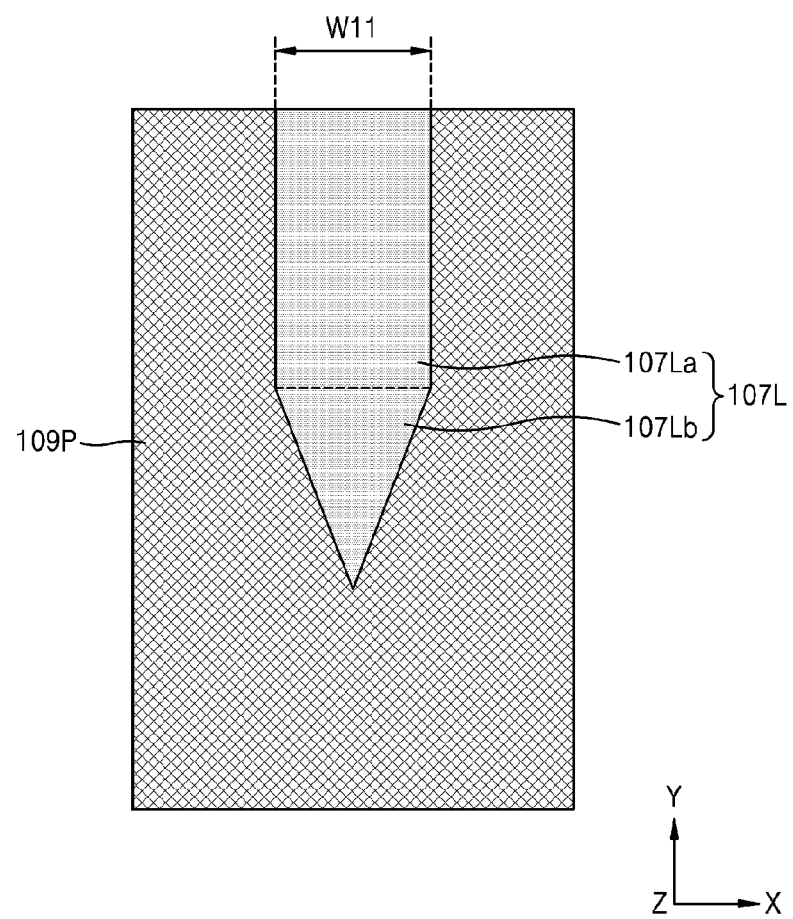

Referring to FIGS. 8A through 8C, the etch stop layer 109L of FIGS. 7A and 7B may be patterned to expose a portion of the first preparatory layer 107L, where a layer that has a greater depth than the etch stop layer 109L is to be formed on the exposed portion later. Therefore, the etch stop pattern 109P may be formed on the first preparatory layer 107L. Here, the etch stop pattern 109P may be formed to expose the entire top surfaces of the first region 107Pa of the first layer 107P and the second region 107Pb of the first layer 107P of FIGS. 1A through 1C. For example, the etch stop pattern 109P may be formed to have a width W11 that is substantially identical to the width L11 of the first region 107Pa of the first layer 107P in a region corresponding to the first region 107Pa of the first layer 107P of FIGS. 1A through 1C.

Figure 9A:
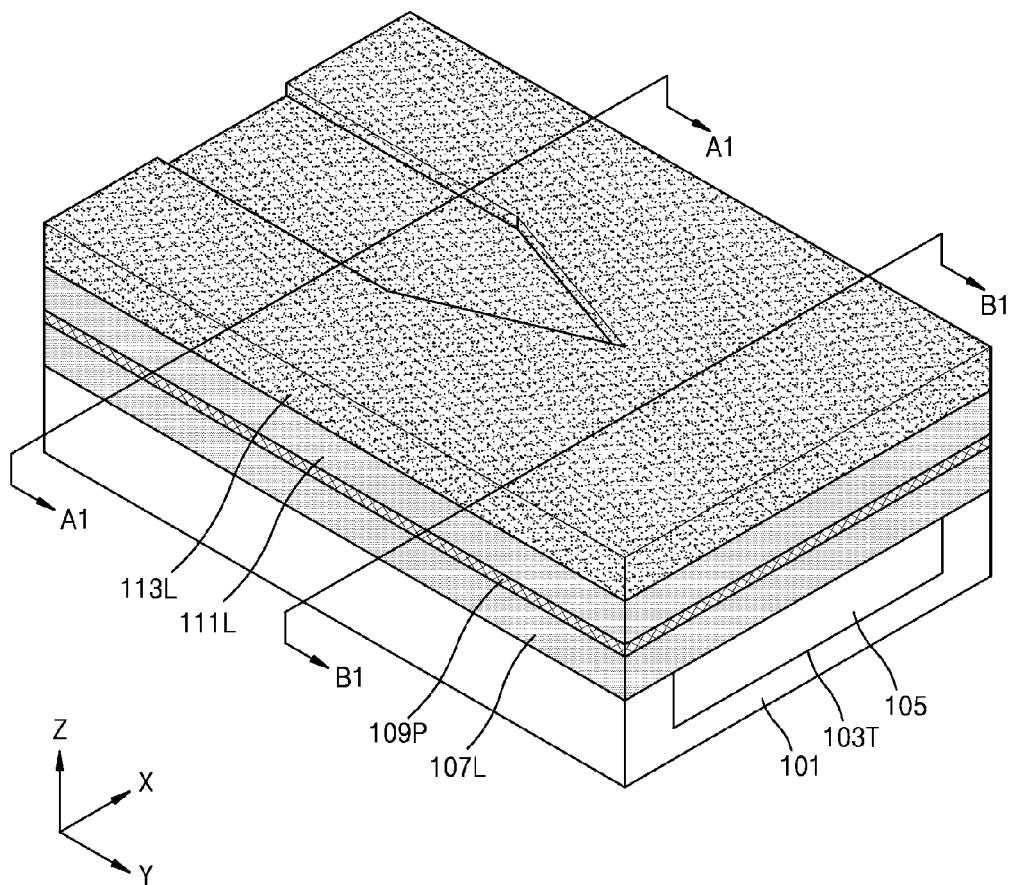
Figure 9B:
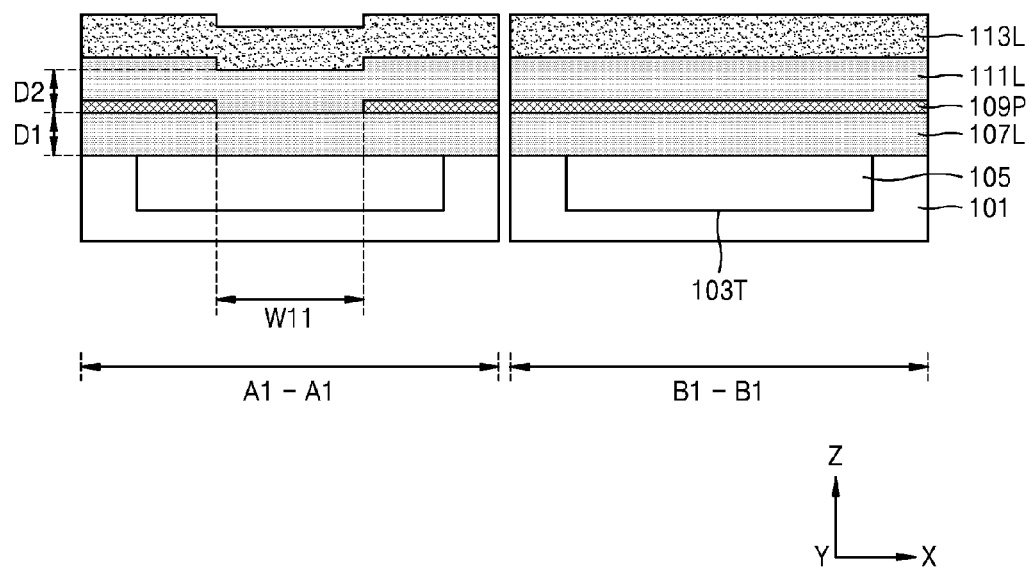

Referring to FIGS. 9A and 9B, the second preparatory layer 111L and a first mask layer 113L may be sequentially formed on the etch stop pattern 109P of FIGS. 8A through 8C and the portion of the first preparatory layer 107L exposed by the etch stop pattern 109P.

The second preparatory layer 111L may be formed to have a second depth D2 and may be used as the second layer 111P of the optical transfer structures of FIGS. 1A through 1C. The second preparatory layer 111L may include an amorphous silicon layer. The second preparatory layer 111L including an amorphous silicon layer may be transformed to a crystalline silicon layer in a later crystallizing operation.

The first mask layer 113L may include a soft mask pattern, such as a photoresist pattern, or a hard mask pattern, such as a silicon oxide (SiO) layer or a silicon nitride (SiN) layer.

Figure 10A:
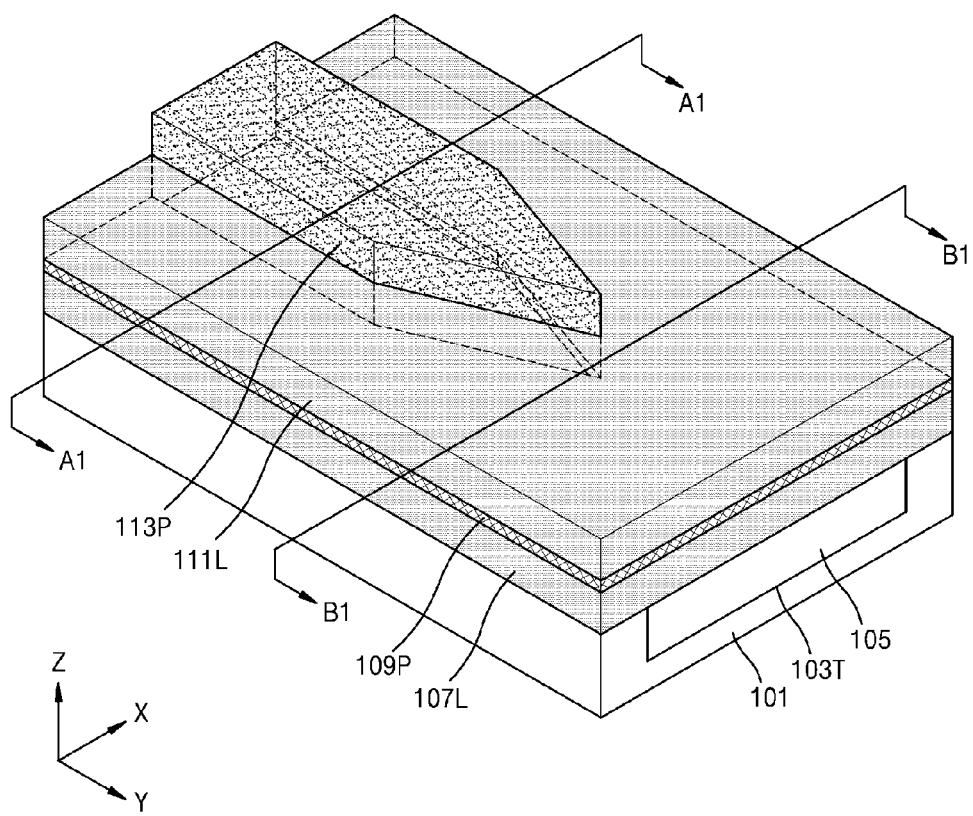
Figure 10B:
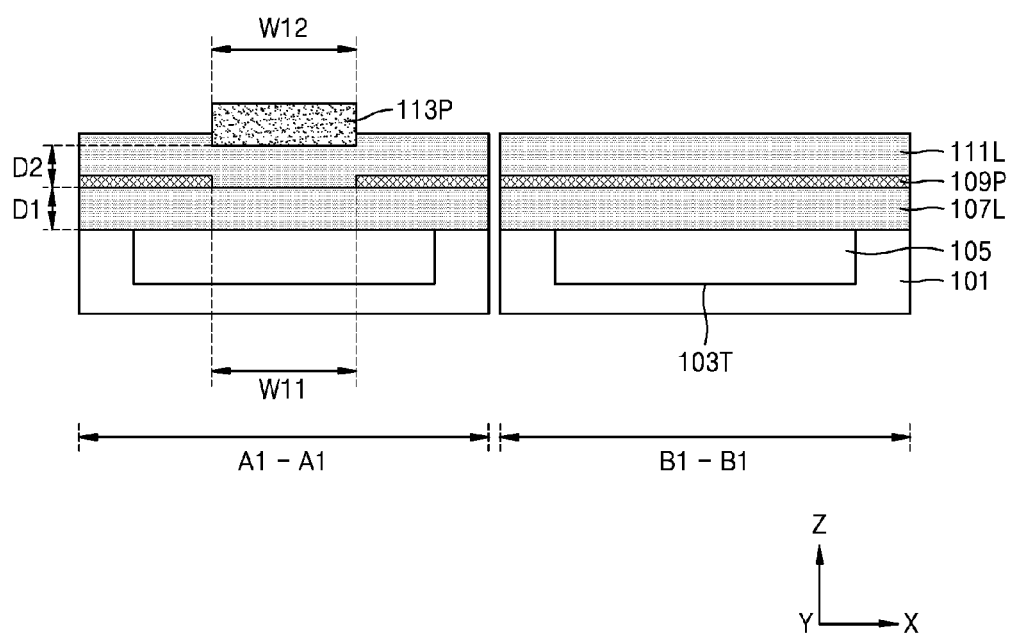
Figure 10C:
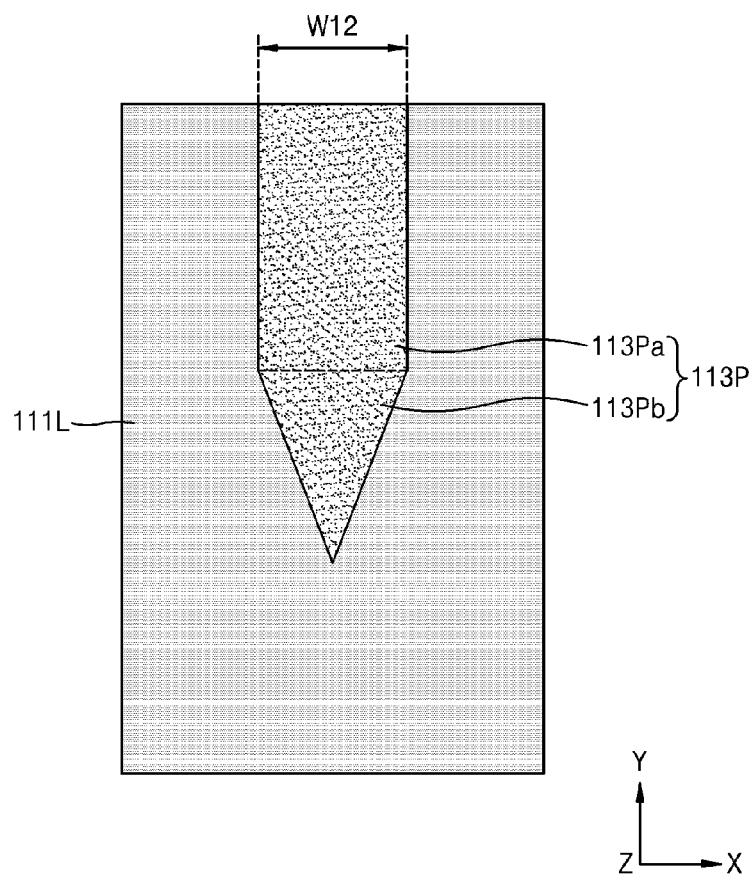

Referring to FIGS. 10A through 10C, the first mask layer 113L of FIGS. 9A and 9B may be patterned to define the second layer 111P of FIGS. 1A through 1C. Therefore, a first mask pattern 113P may be formed on the second preparatory layer 111L. In a later operation, the second layer 111P of FIGS. 1A through 1C may be formed by using the first mask pattern 113P as an etching mask. Therefore, the width L12 of the first region 111Pa of the second layer 111P of FIGS. 1A through 1C may be identical to a width W12 of a portion of the first mask pattern 113P in a region corresponding thereto.

Furthermore, the width W12 of the first mask pattern 113P may be substantially identical to the width W11 of a portion of the etch stop pattern 109P at a region corresponding thereto. In other words, the first mask pattern 113P may be used as an etching mask for etching the second preparatory layer 111L, whereas the etch stop pattern 109P having a reversed pattern of the first mask pattern 113P may be used as an anti-etch mask for preventing the first preparatory layer 107L from being etched in the etching operation.

Figure 11A:
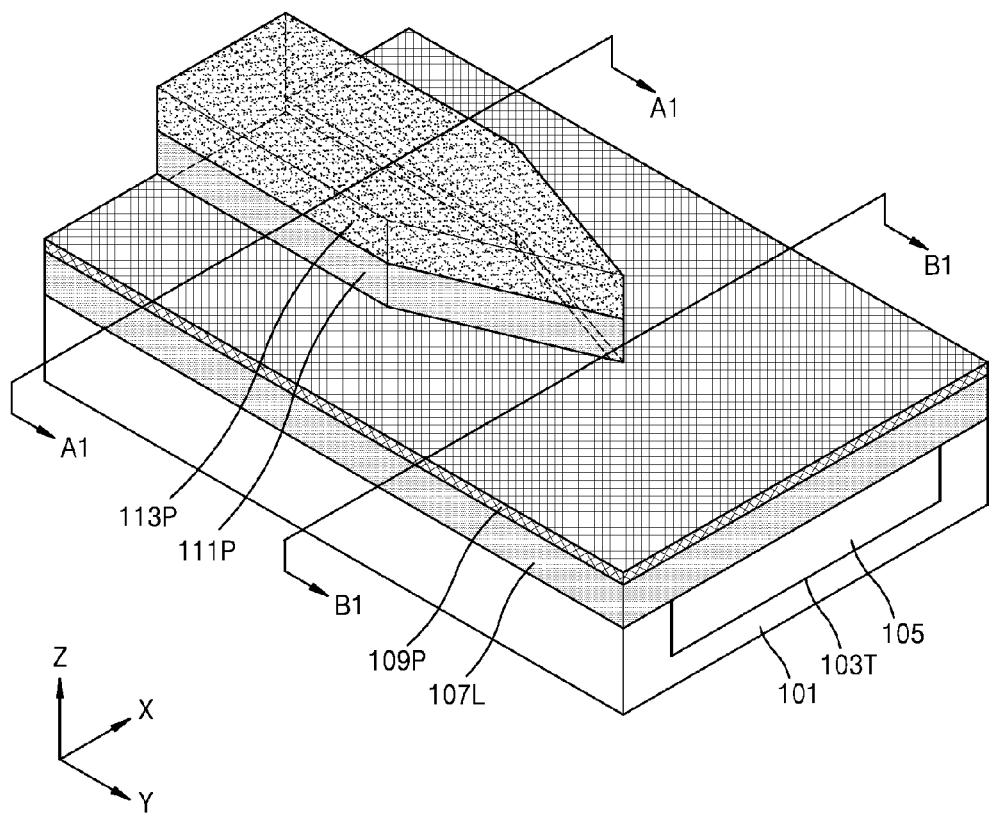
Figure 11B:
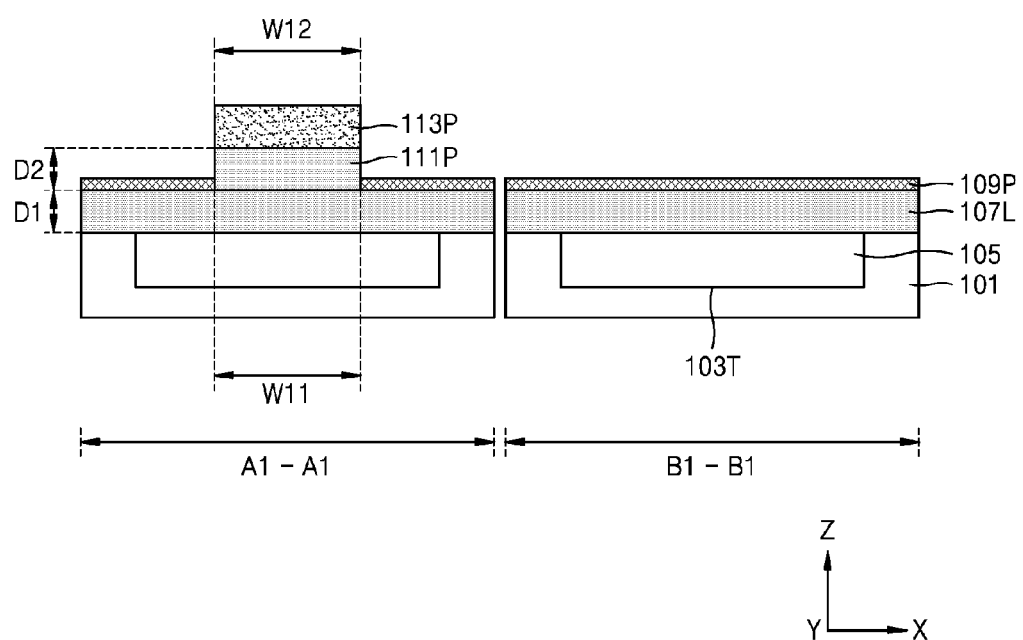

Referring to FIGS. 11A and 11B, the second layer 111P may be formed by selectively etching the second preparatory layer 111L of FIGS. 10A through 10C by using the first mask pattern 113P as an etching mask. The second layer 111P is a portion of the optical transfer structures of FIGS. 1A through 1C.

When the portion of the second preparatory layer 111L exposed by the first mask pattern 113P is completely etched, the top surface of the etch stop pattern 109P may be exposed. The etch stop pattern 109P may protect the first preparatory layer 107L formed therebelow, such that the first preparatory layer 107L is not etched in the etching operation.

Figure 12A:
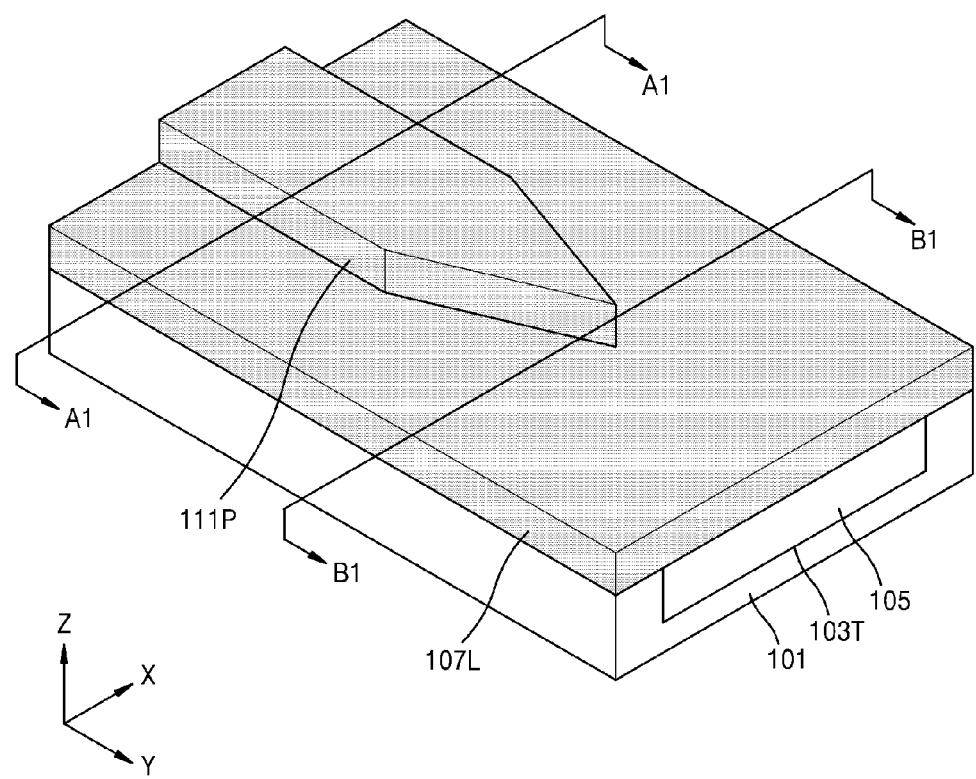
Figure 12B:
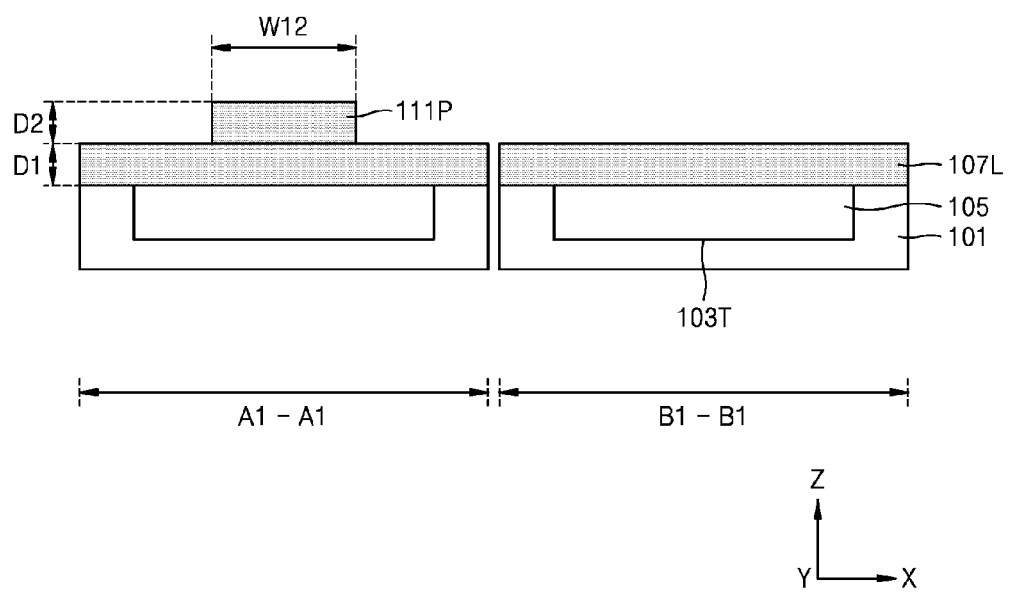

Referring to FIGS. 12A and 12B, the first mask pattern 113P and the etch stop pattern 109P of FIGS. 11A and 11B may be removed.

Next, the first preparatory layer 107L and the second layer 111P, which are amorphous silicon layers, may be transformed to crystalline silicon layers in a crystallizing operation.

The crystallizing operation may be performed based on laser epitaxial growth (LEG), solid phase epitaxy (SPE), epitaxial lateral overgrowth (ELO), selective epitaxial growth (SEG), or a solid phase crystallization (SPC). In other words, the crystallizing operation may be an operation for crystallizing an amorphous silicon layer to a crystalline silicon layer by applying energy, e.g., heat energy or laser energy, to the amorphous silicon layer.

Figure 13A:
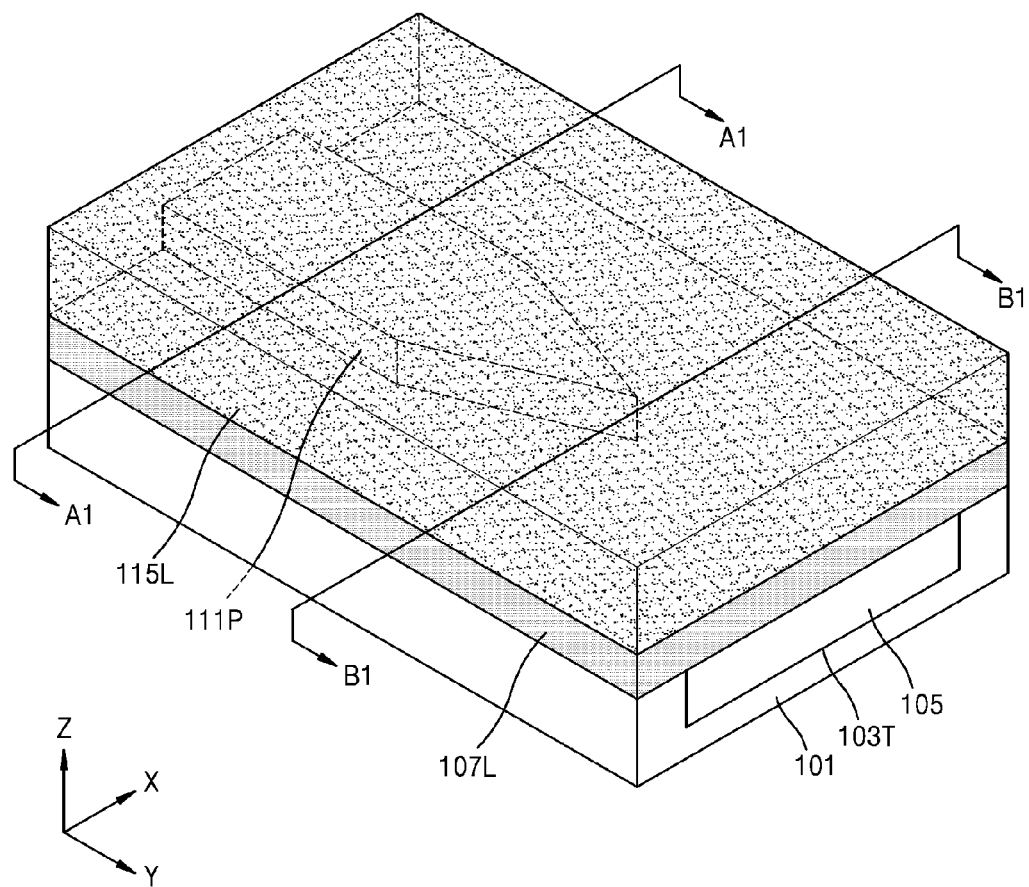
Figure 13B:
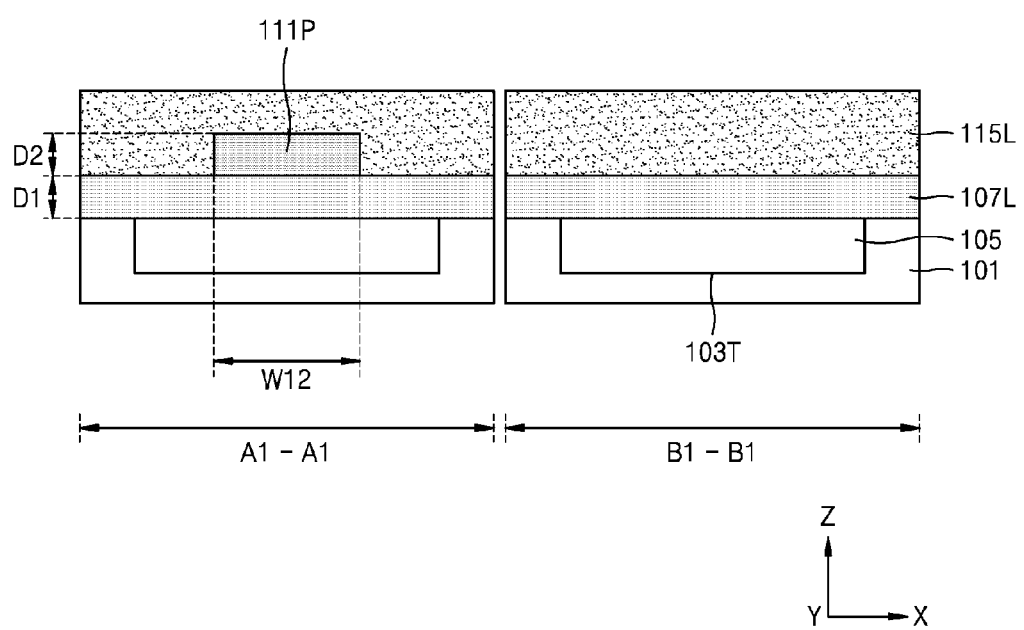

Referring to FIGS. 13A and 13B, a second mask layer 115L may be formed on the first preparatory layer 107L and the second layer 111P. The second mask layer 115L may include a soft mask pattern, such as a photoresist pattern, or a hard mask pattern, such as a silicon oxide (SiO) layer or a silicon nitride (SiN) layer. The second mask layer 115L may be patterned to define the first layer 107P of FIGS. 1A through 1C.

Figure 14A:
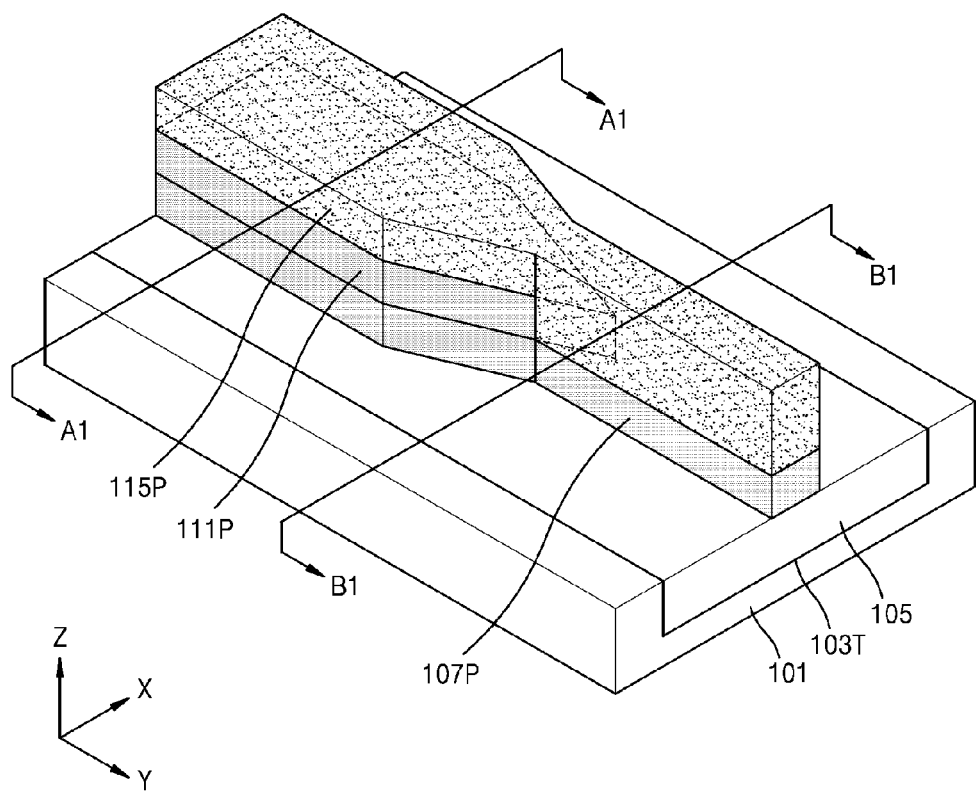
Figure 14B:
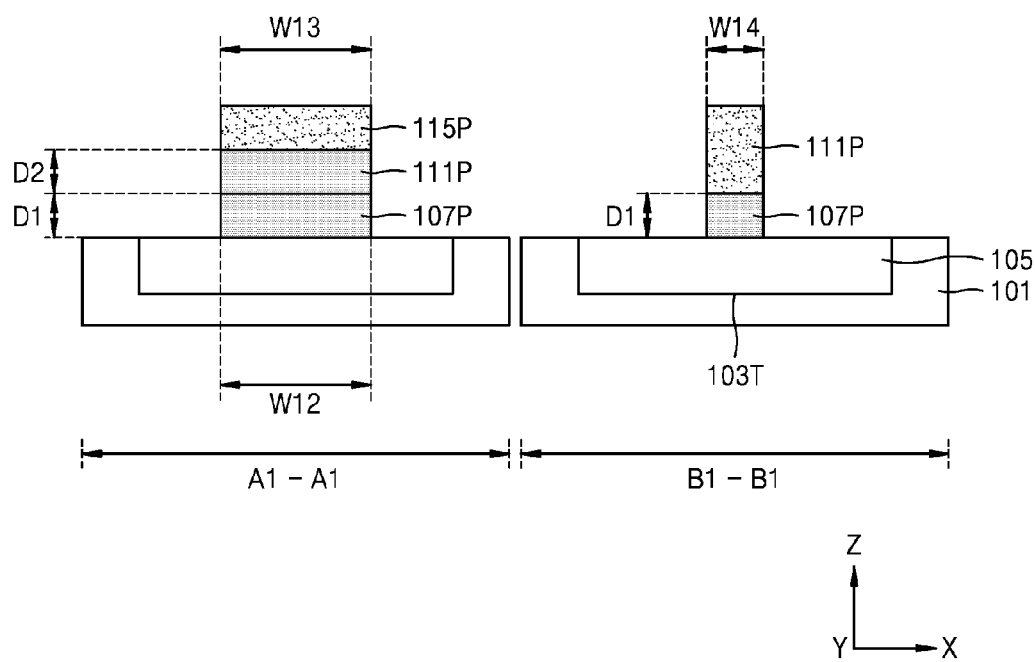
Figure 14C:
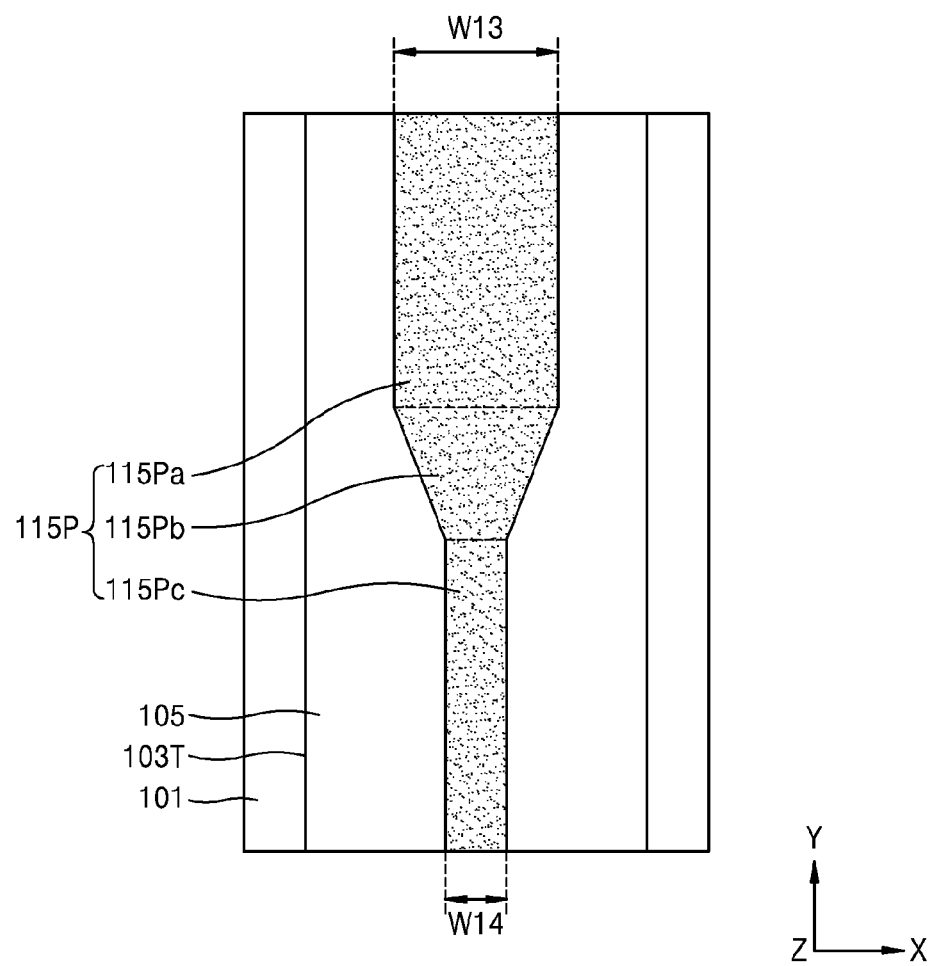

Referring to FIGS. 14A through 14C, the second mask layer 115L of FIGS. 13A and 13B may be patterned to define the first layer 107P of FIGS. 1A through 1C and may be formed as a second mask pattern 115P.

In a later operation, the second layer 111P of FIGS. 1A through 1C may be formed by using the second mask pattern 115P as an etching mask. Therefore, the width L11 of the first region 107Pa of the first layer 107P of FIGS. 1A through 1C may be identical to a width W13 of a portion of the first mask pattern 113P at a region corresponding thereto. Furthermore, the width L13 of the third region 107Pc of the first layer 107P of FIGS. 1A through 1C may be substantially identical to a width W14 of a portion of the first mask pattern 113P at a region corresponding thereto.

Next, the optical device 100 of FIGS. 1A through 1C including multiple structures with different depths and different shapes may be manufactured by removing the second mask pattern 115P. That is, the first structures, the connecting structures, and the second structure may be manufactured by removing the second mask pattern 115P.

However, a method of manufacturing the optical device 100 is not limited to the method shown in FIGS. 6A through 14C, where the optical device 100 may also be manufactured via a general etching operation with etching time control or a lift-off operation. However, depths of structures may be controlled at high precision according to the above-stated method, and thus functions of individual structures constituting the optical device 100 may be improved.

FIGS. 15A through 20B are perspective diagrams, cross-sectional diagrams, and plan diagrams sequentially showing operations of a method of manufacturing the optical devices 200 and 300 according to embodiments shown in FIGS. 2A through 3B. Here, preceding operations may be identical to the operations shown in FIGS. 4A through 9B, and thus detailed descriptions thereof will be omitted.

Figure 15A:
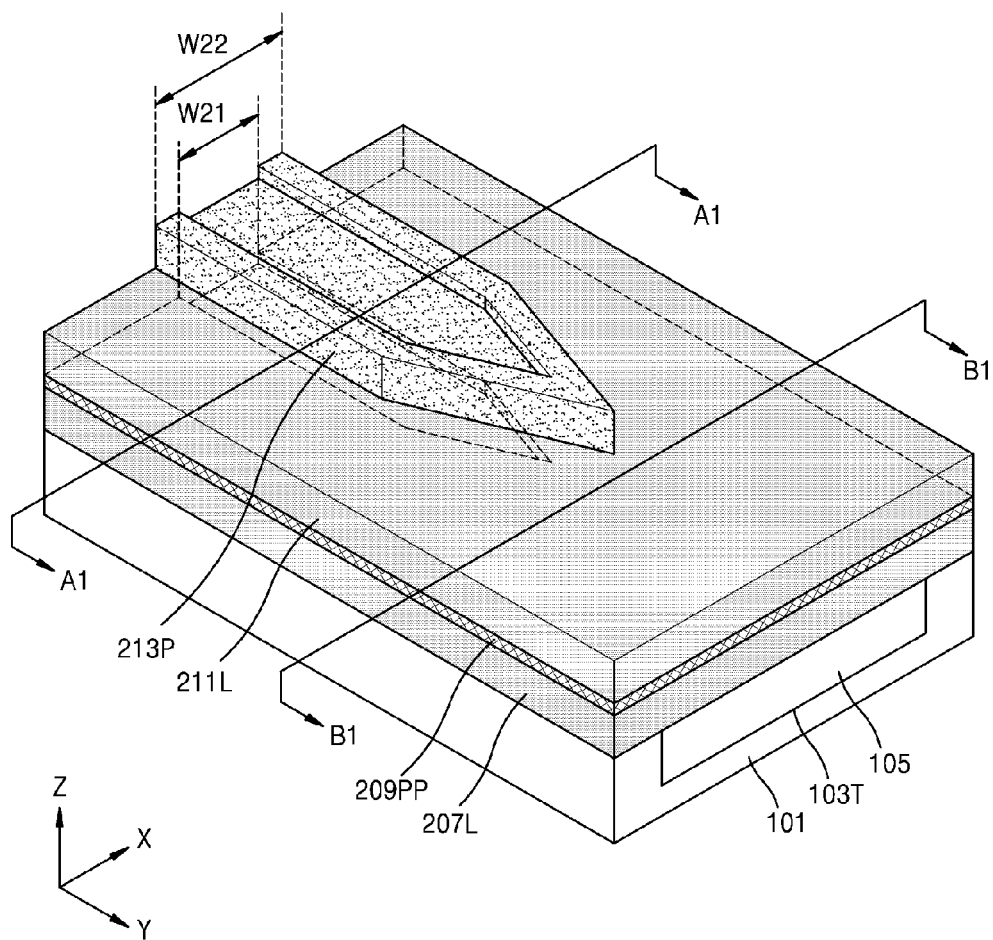
FIGS. 15A through 20B are perspective diagrams, cross-sectional diagrams, and plan diagrams sequentially showing operations of a method of manufacturing the optical devices according to embodiments shown in FIGS. 2A through 3B.
Figure 15B:
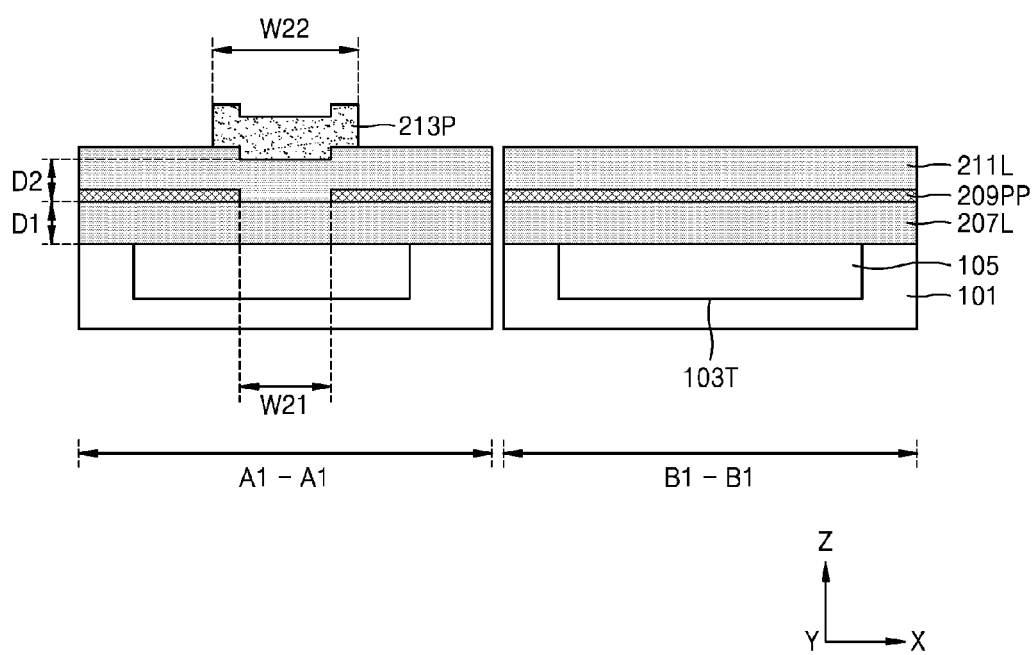

Referring to FIGS. 15A and 15B, the first mask layer 213L of FIGS. 9A and 9B may be patterned to define the second layer 211P of FIGS. 2A and 2B. Therefore, a first mask pattern 213P may be formed on a second preparatory layer 211L. In a later operation, the second layer 211P of FIGS. 2A and 2B may be formed by using the first mask pattern 213P as an etching mask. Here, a width W22 of the first mask pattern 213P may be identical to a width W21 of a portion of an etch stop pattern 209P at a region corresponding thereto.

As described above, the first mask pattern 213P may be used as an etching mask for etching the second preparatory layer 211L. Furthermore, the etch stop pattern 209P that is arranged below the second preparatory layer 211L and has a reversed pattern of the first mask pattern 213P may be used as an anti-etch mask for preventing a first preparatory layer 207L from being etched in the etching operation. Here, if the first mask pattern 213P and the etch stop pattern 209P are not well aligned to each other, a portion of the first preparatory layer 207L exposed by the etch stop pattern 209P may not be protected by the etch stop pattern 209P and etched. Therefore, the first mask pattern 213P may be formed to have the width W22 that is a certain width greater than the width W21 of the etch stop pattern 209P. Therefore, even if the first mask pattern 213P and the etch stop pattern 209P are not well aligned to each other, the portion of the first preparatory layer 207L exposed by the etch stop pattern 209P may be protected by the first mask pattern 213P.

Therefore, unintended etching of the first preparatory layer 207L may be prevented while the second preparatory layer 211L is being etched.

Figure 16A:
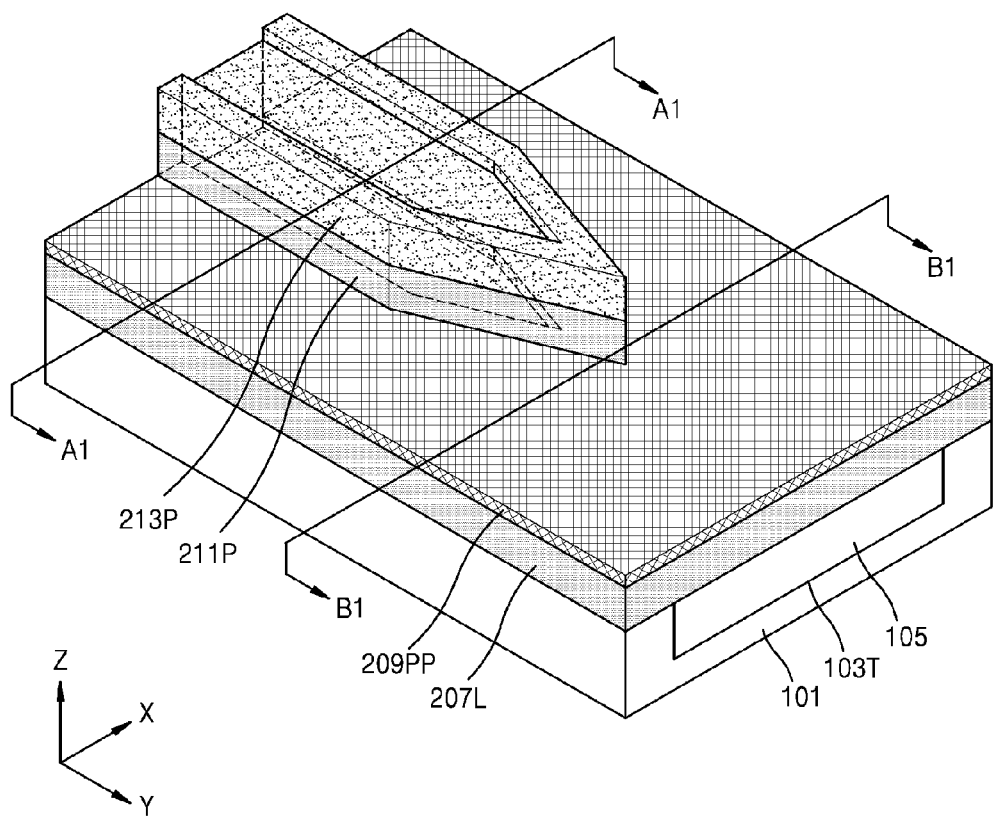
Figure 16B:
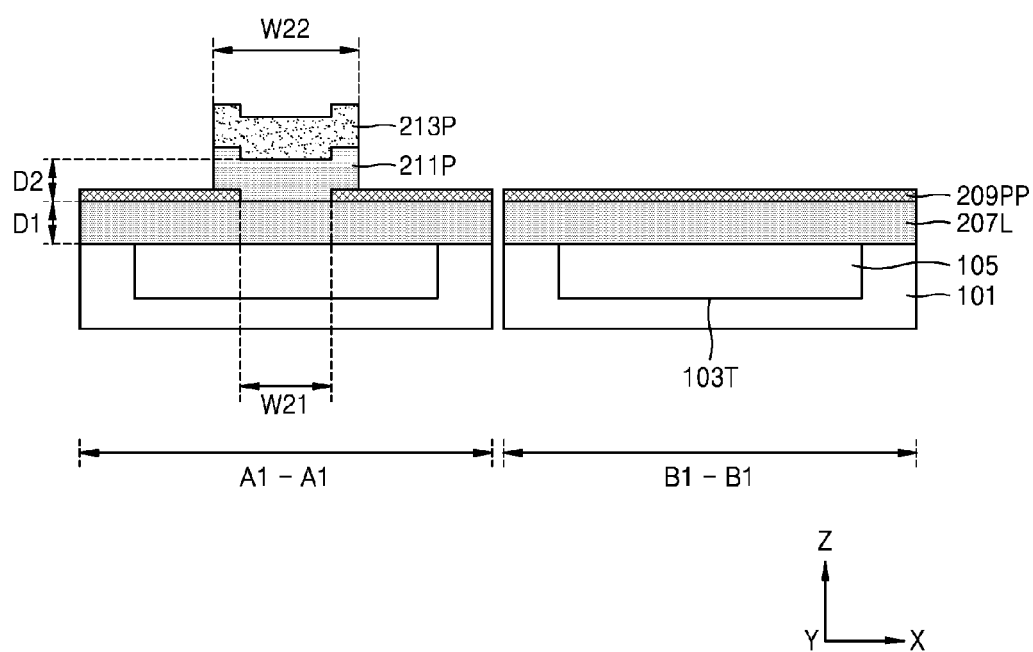

Referring to FIGS. 16A and 16B, the second layer 211P may be formed by selectively etching the second preparatory layer 211L of FIGS. 15A through 15C by using the first mask pattern 213P as an etching mask. The second layer 211P is a portion of the optical transfer structures of FIGS. 2A and 2B.

When the portion of the second preparatory layer 211L exposed by the first mask pattern 213P is completely etched, the top surface of the etch stop pattern 209P may be exposed. The etch stop pattern 209P may protect the first preparatory layer 207L formed therebelow, such that the first preparatory layer 207L is not etched in the etching operation.

Here, the width W22 of the first mask pattern 213P may be greater than the width W21 of a portion of the etch stop pattern 209P at a region corresponding thereto.

Figure 17A:
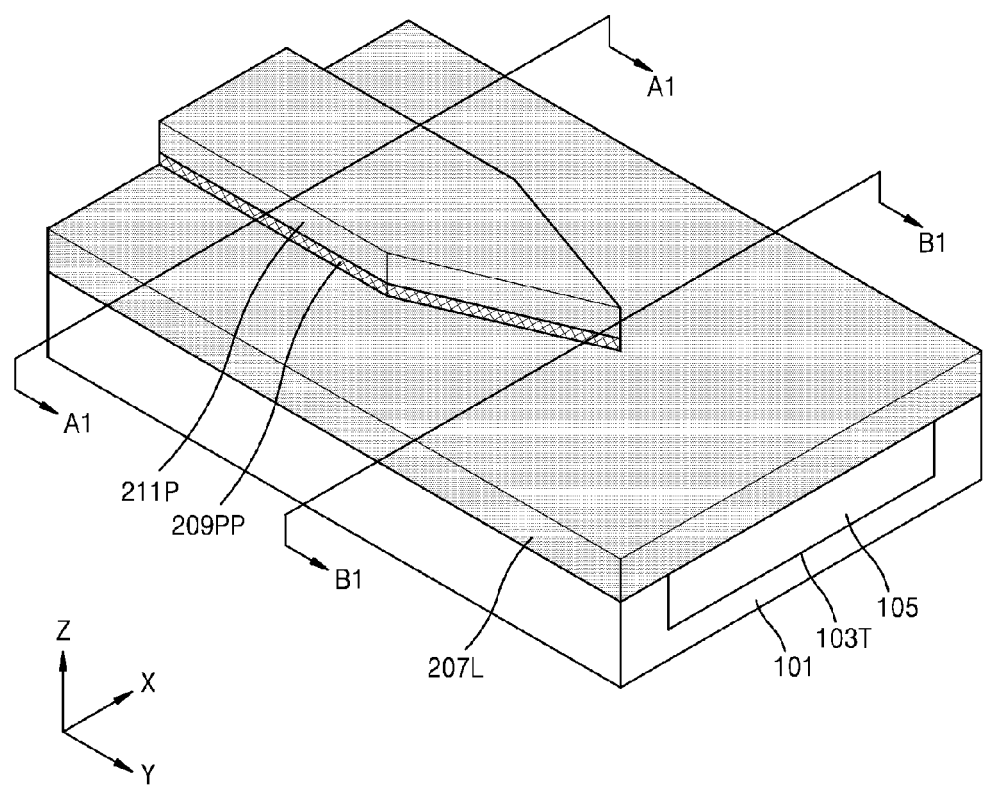
Figure 17B:
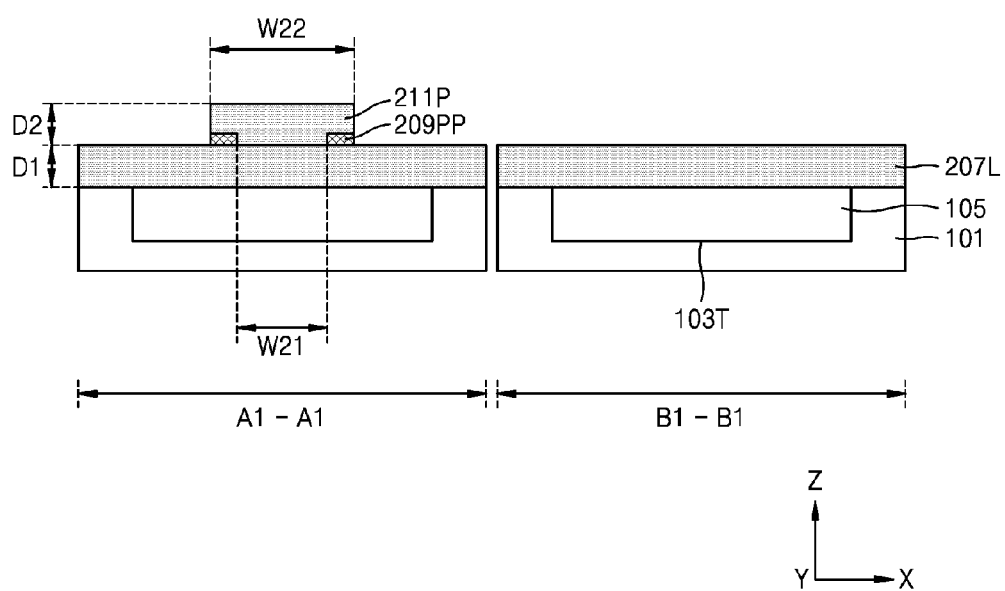

Referring to FIGS. 17A and 17B, a region with the top surface exposed to outside between the first mask pattern 213P and the etch stop pattern 209P of FIGS. 16A and 16B formed on the second layer 211P may be selectively removed.

Here, the width W22 of the second layer 211P may be greater than the width W21 of the etch stop pattern 209P of FIGS. 16A and 16B. Therefore, a portion of the etch stop pattern 209P may be formed as a band-like portion around the bottom edge portions of the side surfaces of the second layer 211P.

Next, the first preparatory layer 207L and the second layer 211P, which are amorphous silicon layers, may be transformed to crystalline silicon layers in a crystallizing operation. The crystallizing operation may be an operation for crystallizing an amorphous silicon layer to a crystalline silicon layer by applying energy, e.g., heat energy or laser energy, to the amorphous silicon layer. Details thereof are as described above.

Figure 18A:
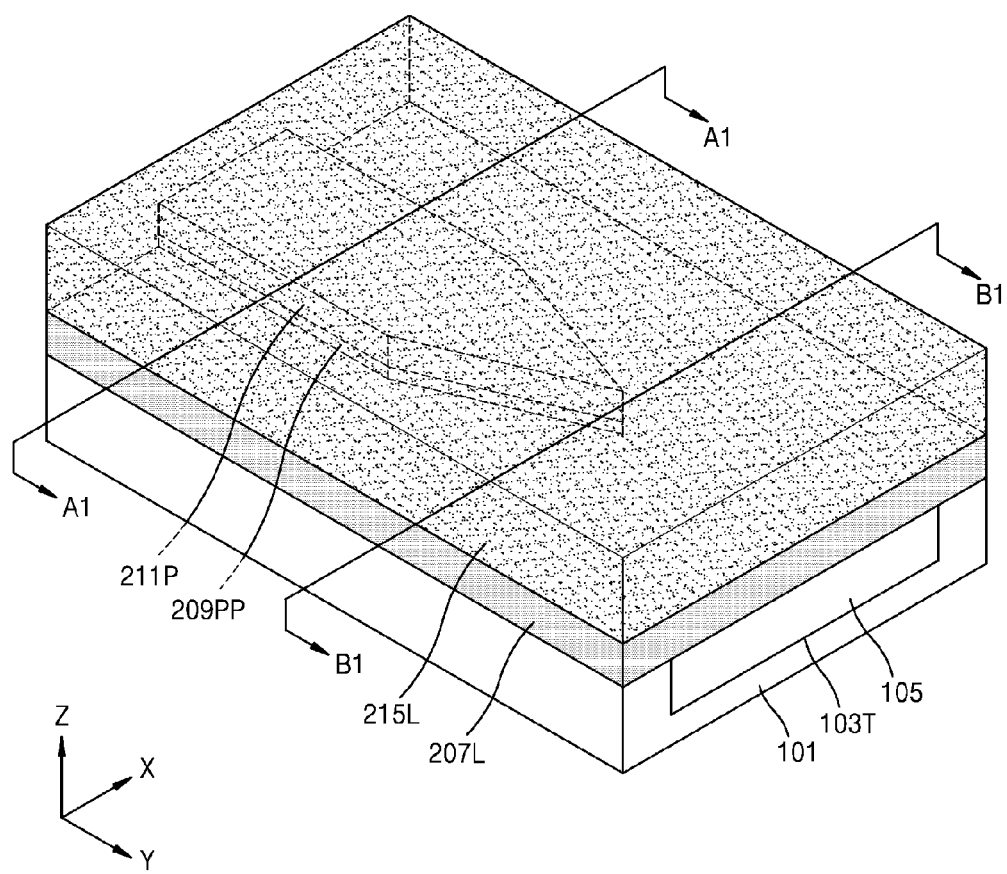
Figure 18B:
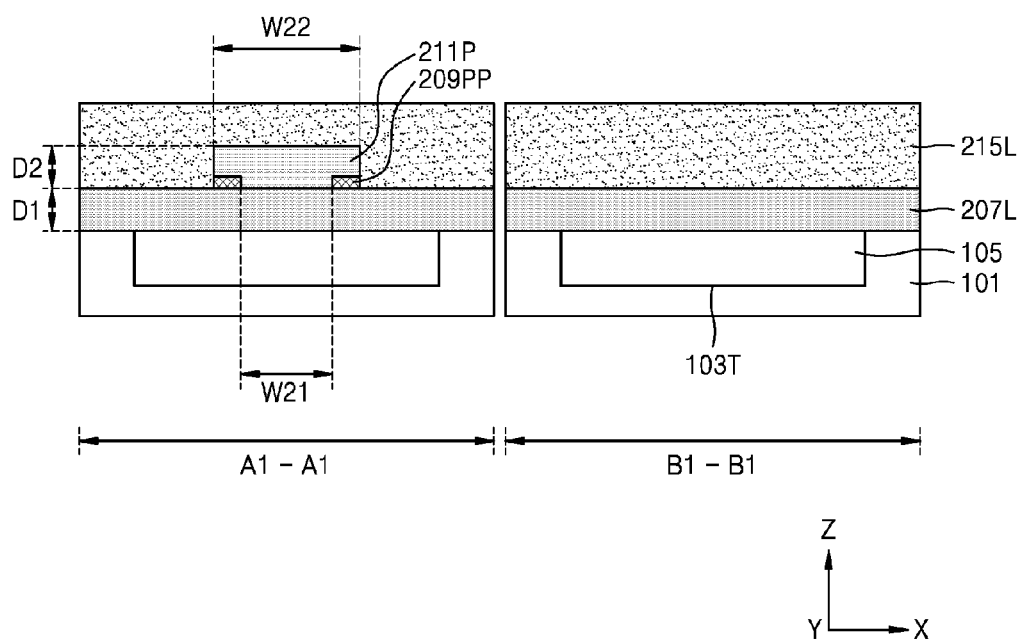

Referring to FIGS. 18A and 18B, a second mask layer 215L may be formed on the first preparatory layer 207L and the second layer 211P. The second mask layer 215L may be a soft mask pattern or a hard mask pattern.

Figure 19A:
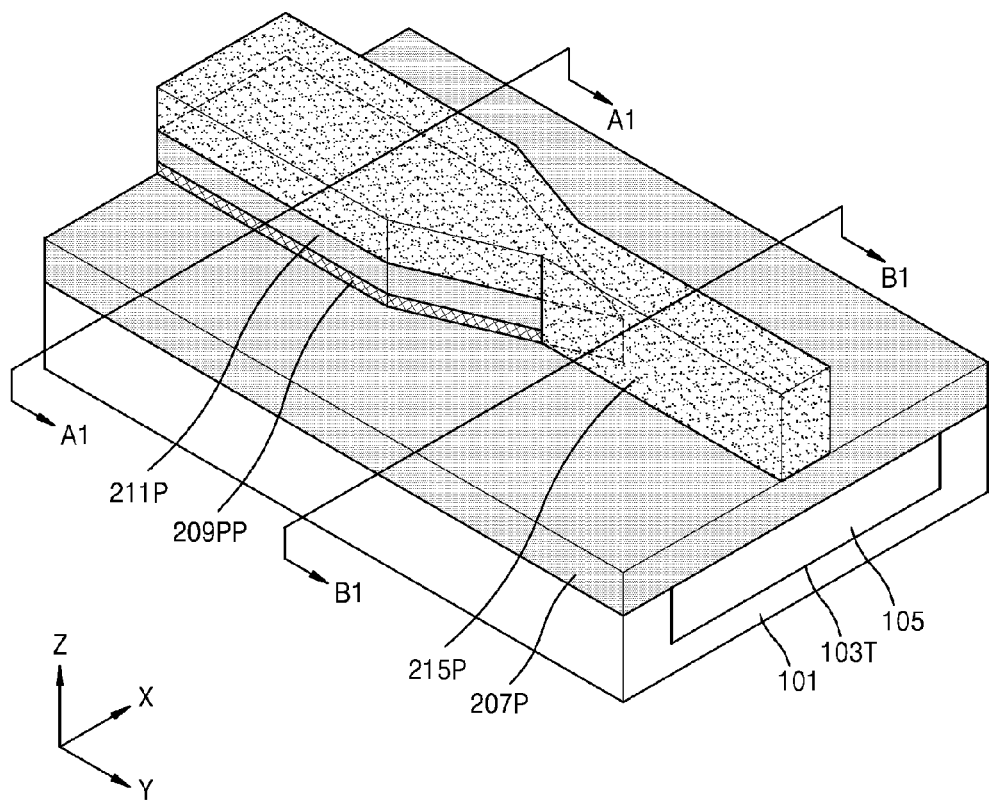
Figure 19B:
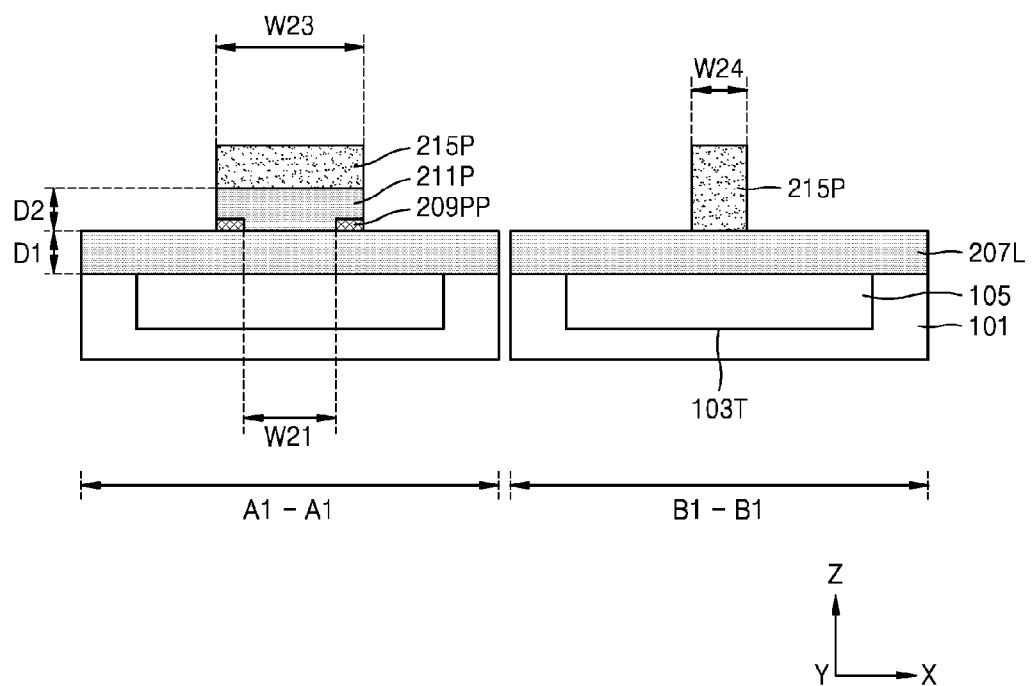

Referring to FIGS. 19A and 19B, the second mask layer 215L of FIGS. 18A and 18B may be patterned to define the first layer 207P of FIGS. 2A and 2B and form a second mask pattern 215P. Here, a width W23 of the second mask pattern 215P may be selected to be identical to the width of the second layer 211P. However, the present disclosure is not limited thereto.

Figure 20A:
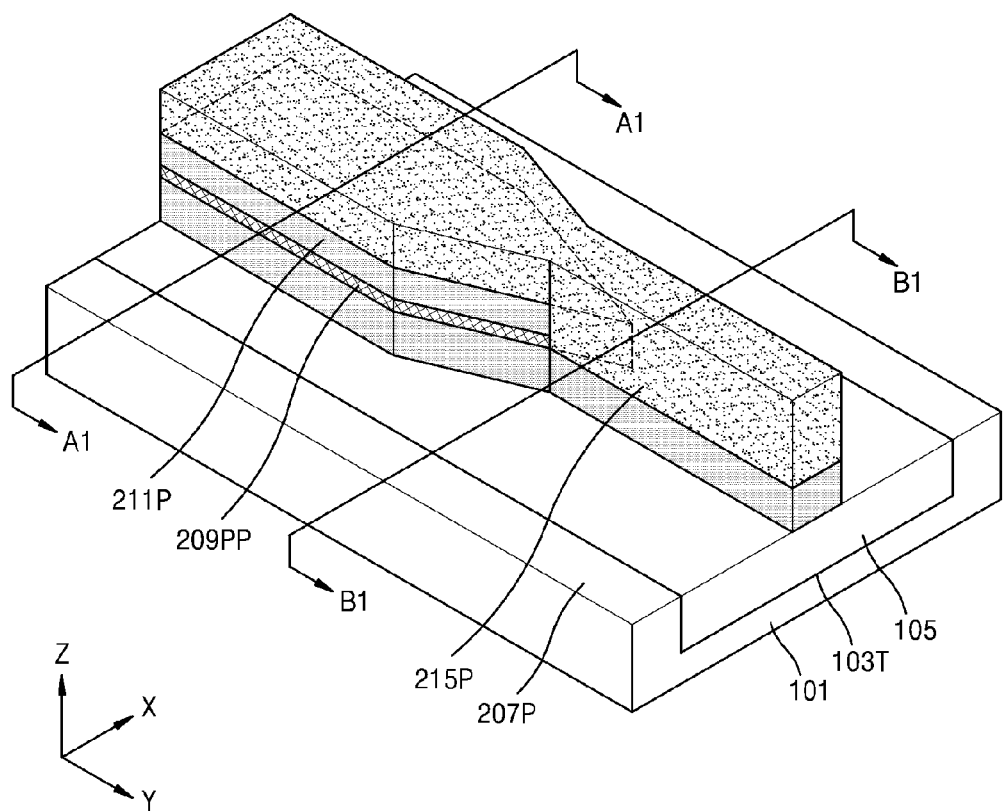
Figure 20B:
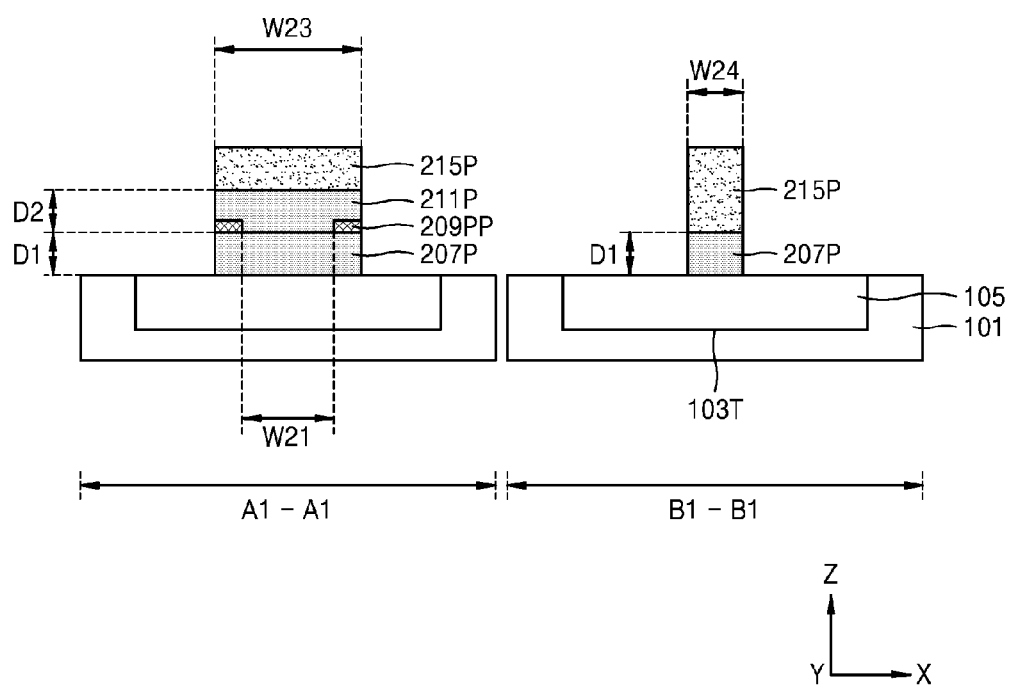

Referring to FIGS. 20A and 20B, the second layer 211P may be formed by etching the second preparatory layer 211L of FIGS. 19A and 19B by using the second mask pattern 215P as an etching mask. The width of the first layer 207P may be identical to the width of the second layer 211P formed on the first layer 207P.

Next, the optical device 200 of FIGS. 2A and 2B including multiple structures with different depths and different shapes may be manufactured by removing the second mask pattern 215P. That is, the first structures, the connecting structures, and the second structure may be manufactured by removing the second mask pattern 215P.

The optical device 300 of FIGS. 3A and 3B may also be manufactured in operations similar to those described above with reference to FIGS. 15A through 20B. In other words, the optical device 300 may be manufactured by additionally removing the etch stop pattern 209P that is formed as a band-like pattern around bottom edge portions of the side surfaces of the second layer 211P. In this case, an isotropic etching operation may be performed.

Therefore, referring back to FIGS. 3A and 3B, the optical device 300 may be manufactured to include the groove G that exposes edge portions of the top surface of the first layer 207P and is formed around the bottom edge portions of the side surfaces of the second layer 211P.

FIGS. 21A through 22B are perspective diagrams, cross-sectional diagrams, and plan diagrams sequentially showing operations of a method of manufacturing the optical devices 400 and 500 according to embodiments shown in FIGS. 4A through 5C. Here, preceding operations may be identical to the operations shown in FIGS. 4A through 13B, and thus detailed descriptions thereof will be omitted.

Figure 21A:
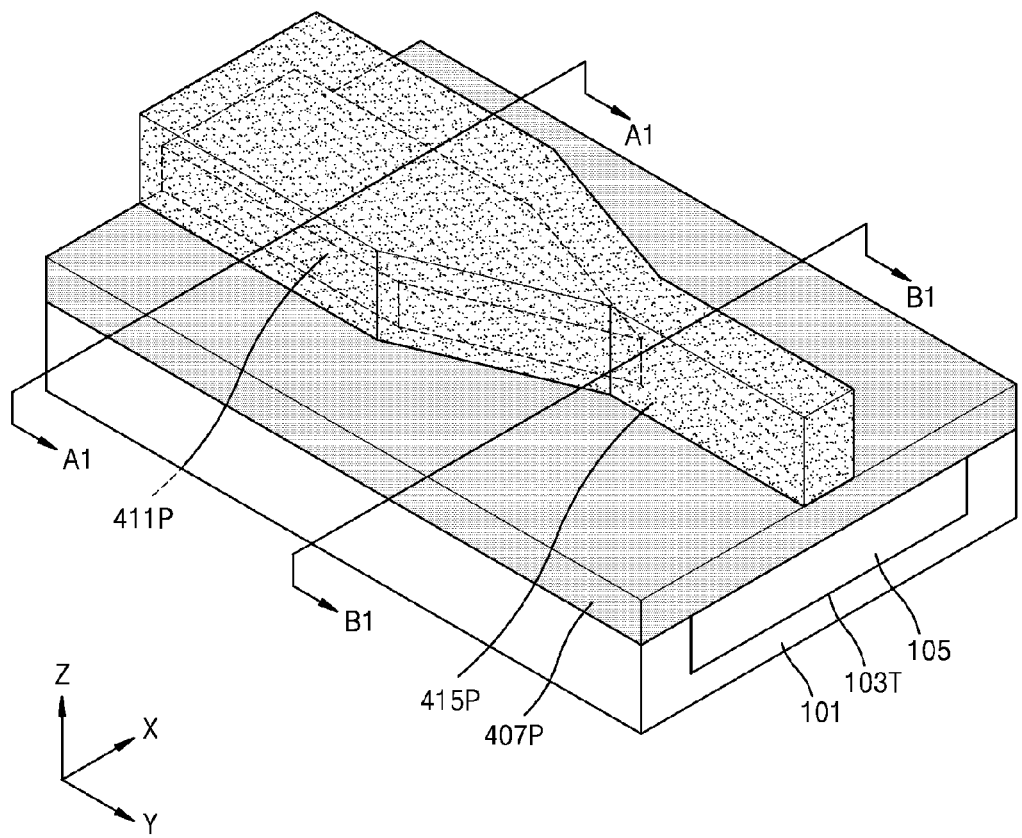
FIGS. 21A through 22B are perspective diagrams, cross-sectional diagrams, and plan diagrams sequentially showing operations of a method of manufacturing the optical devices according to embodiments shown in FIGS. 4A through 5C.
Figure 21B:
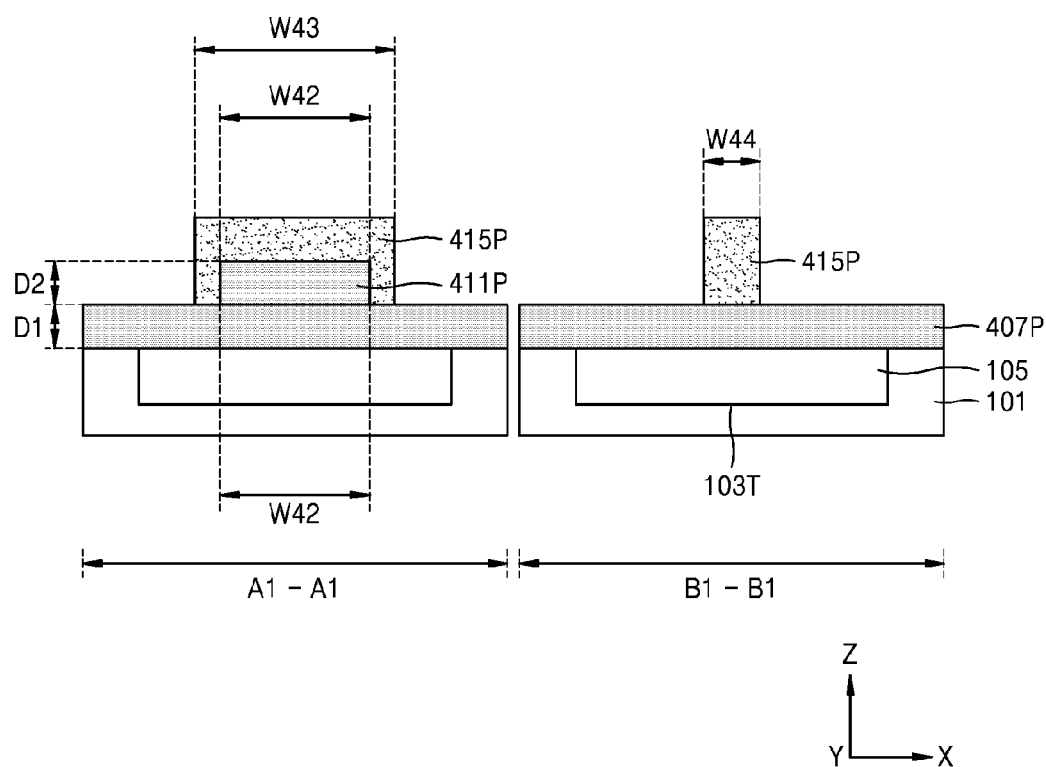

Referring to FIGS. 21A and 21B, the second mask layer 415L of FIGS. 9A and 9B may be patterned to define the first layer 407P of FIGS. 4A through 4C, thereby forming a second mask pattern 415P. Here, a width W43 of the second mask pattern 415P for patterning the first layer 407P may be greater than a width W42 of the second layer 411P.

Figure 22A:
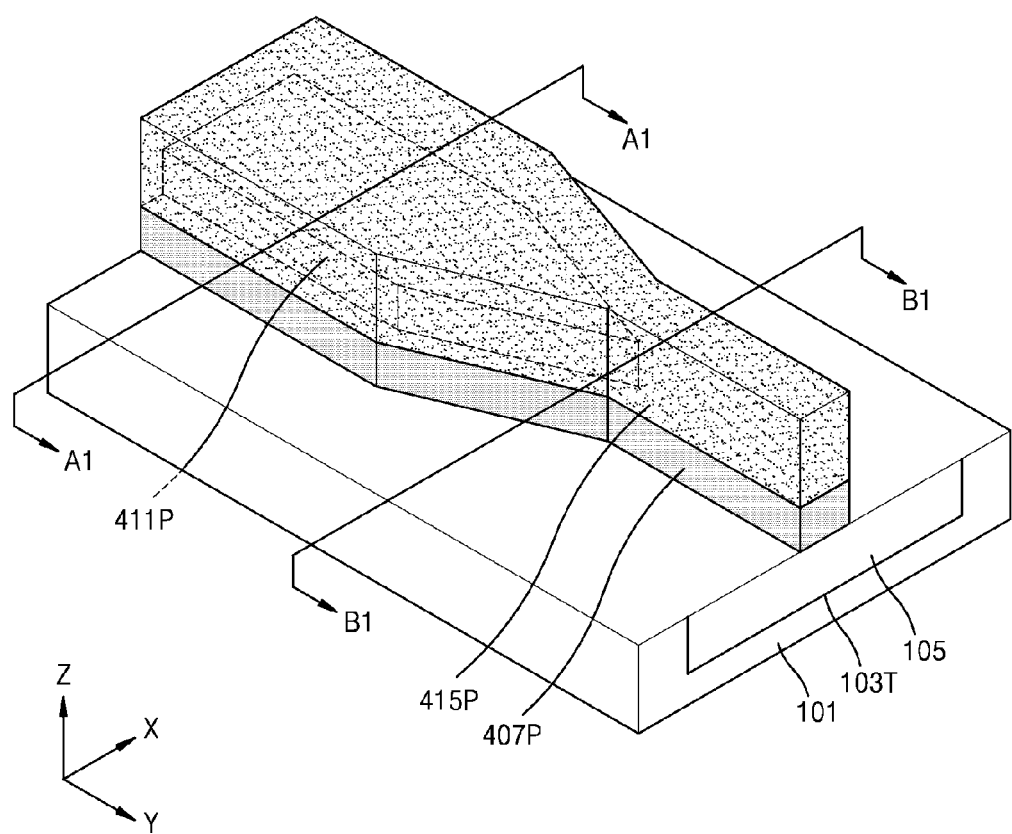
Figure 22B:
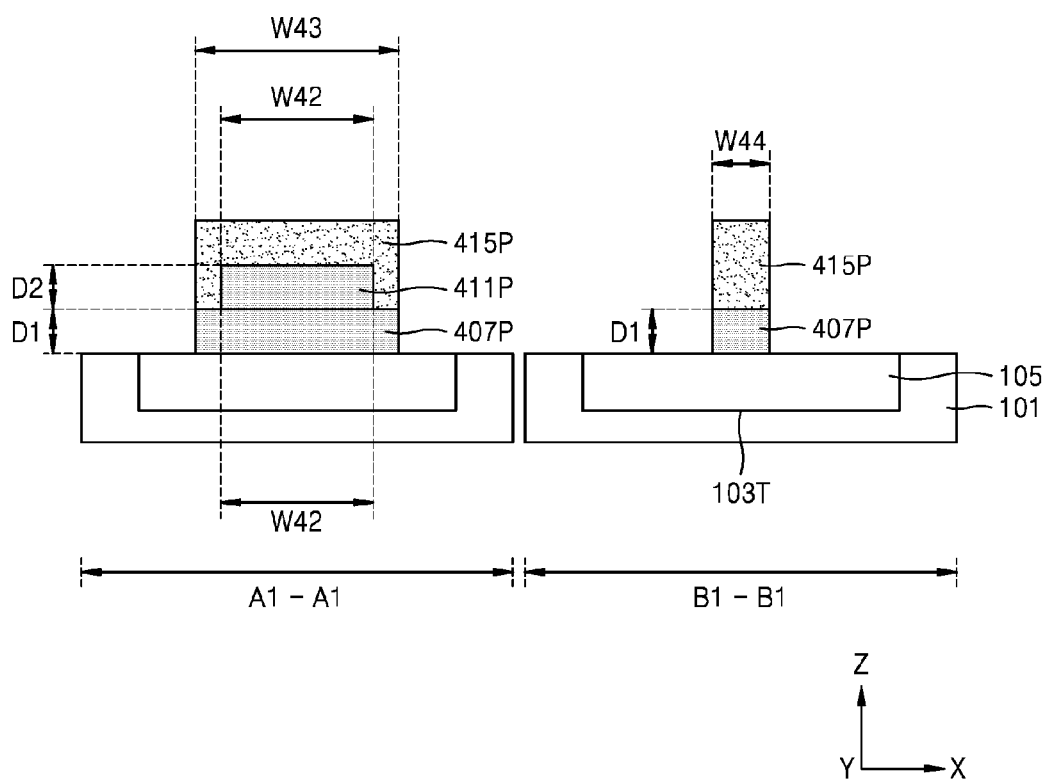

Referring to FIGS. 22A and 22B, the first layer 407P may be formed by using the second mask pattern 415P as an etching mask. Therefore, the width W43 of the first layer 407P may be greater than the width W42 of the second layer 411P. As a result, steps may be formed between the first layer 407P and the second layer 411P.

Next, the optical device 400 of FIGS. 4A through 4C including a plurality of structures with different depths and different shapes may be manufactured by removing the second mas pattern 415P. That is, the first structures, the connecting structures, and the second structure may be manufactured by removing the second mask pattern 415P.

The optical device 500 of FIGS. 5A and 5B may also be manufactured in operations similar to those described above with reference to FIGS. 6A through 13B and FIGS. 21A and 21B.

However, in FIGS. 11A and 13B, only the first mask pattern 113P formed on the second layer 111P may be removed, whereas the etch stop pattern 109P may not be removed. Next, the second mask layer 115L may be formed on the etch stop pattern 109P and the second layer 111P.

Referring back to FIGS. 21A through 22B, the second mask pattern 415P having the width W43 greater than the width W42 of the second layer 411P may be formed on the etch stop pattern 109P. Therefore, due to the difference between widths of the first layer 407P and the second layer 411P, some of surfaces of the first layer 407P may not overlap the second layer 411P and may be exposed.

Next, referring to FIGS. 5A through 5C, the optical device 500 may be manufactured by removing the second mask pattern 415P. An etch stop pattern 509PP may be formed at edge portions of the first layer 407P that do not overlap the second layer 411P to have a band-like shape. According to the above-stated operations, the optical device 500 of FIGS. 5A through 5C including multiple structures having different depths and different shapes may be manufactured. That is, the first structures, the connecting structures, and the second structure may be manufactured.

Figure 23:
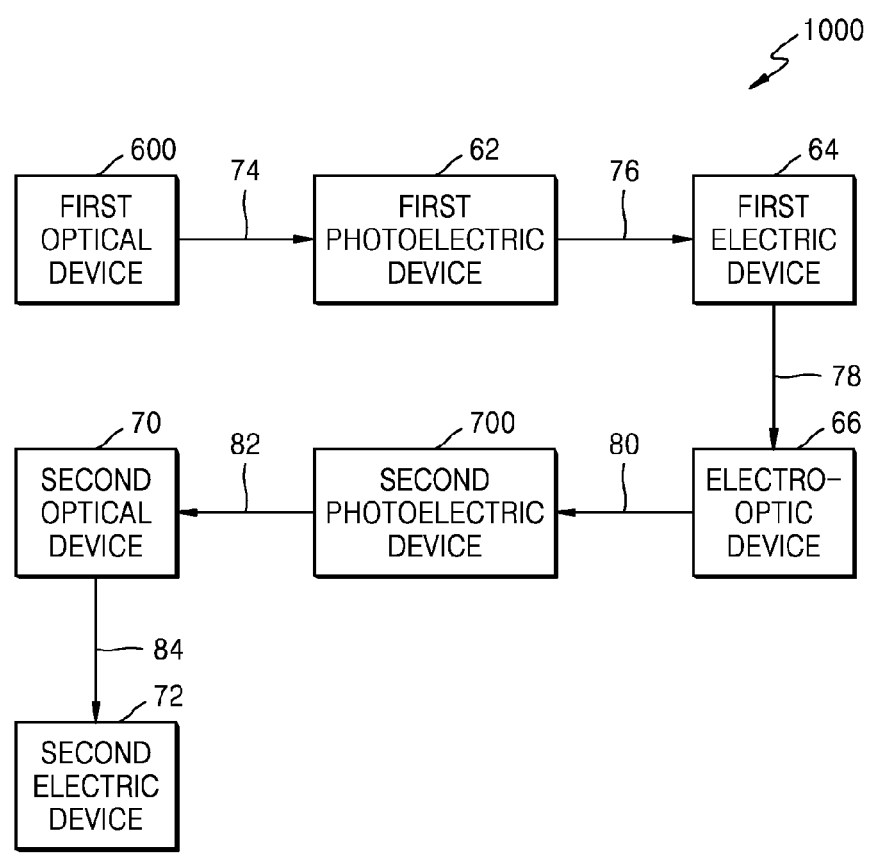
FIG. 23 is a block diagram for describing a photoelectric integrated circuit device employing an optical device according to embodiments of the present disclosure.

FIG. 23 is a block diagram for describing a photoelectric integrated circuit device employing an optical device according to embodiments of the present disclosure. Optical signals are denoted by the reference numerals 74, 80, and 82, whereas electric signals are denoted by the reference numerals 76, 78, and 84.

Referring to FIG. 23, a photoelectric integrated circuit device 1000 includes first and second optical devices 600 and 700, first and second photoelectric devices 62 and 70, first and second electronic devices 64 and 72, and an electro-optic device 66. Optical signals 74, 80, and 82 or electric signals 76, 78, and 84 may be exchanged between the devices.

The first and second electronic devices 64 and 72 may be memory devices, such as DRAMs. The first and second optical devices 600 and 700 of FIG. 23 may be at least one of the optical devices 100, 200, 300, 400, and 500 described above with reference to FIGS. 1A through 5C. Although FIG. 23 shows that the photoelectric integrated circuit device 1000 includes the two optical devices 600 and 700 and the two electronic devices 64 and 72, the photoelectric integrated circuit device 1000 may also include three or more optical devices and/or three or more electric devices.

Communications from the first and second optical devices 600 and 700 to the first and second electronic devices 64 and 72 may be performed by using the first and second photoelectric devices 62 and 70. The first and second photoelectric devices 62 and 70 may receive optical signals and generate electric signals. Communications from the first and second electronic devices 64 and 72 to the first and second optical devices 600 and 700 may be performed by using the electro-optic device 66. The electro-optic device 66 may receive electric signals and generate optical signals.

While the present disclosure has been particularly shown and described with reference to embodiments thereof, it will be understood that various changes in form and details may be made therein without departing from the spirit and scope of the following claims.

What is claimed is:

1. An optical device, comprising:
   a substrate;
   a trench in a portion of the substrate;
   a clad layer arranged in the trench;
   a first structure arranged on the clad layer to have a first depth;
   a second structure arranged on the clad layer to have a second depth different from lesser than the first depth;
   a connecting structure that interconnects the first structure and the second structure, wherein an optical transfer structure including the first structure, the connecting structure, and the second structure comprises a first layer and a second layer on a portion of the first layer; and
   a material layer arranged on an exposed portion of a top surface of the first layer, wherein etching selectivity of the material layer is different from etching selectivity of materials constituting the first layer and the second layer.

2. The optical device of claim 1,
   wherein the connecting structure interconnects the first and second structures in a first direction,
   wherein the first and second depths are extended in a second direction,
   wherein a width of the first structure is greater than a width of the second structure, and
   a width of the connecting structure in a third direction perpendicular to the first and second directions decreases along the first direction from an end portion connected to the first structure to an end portion connected to the second structure.

3. The optical device of claim 2,
   wherein the first depth is greater than the second depth, and
   wherein the connecting structure has the first depth.

4. The optical device of claim 2,
   wherein the first structure includes a first region of the second layer stacked on a first region of the first layer,
   wherein the connecting structure includes a tapered second region of the second layer stacked on a tapered second region of the first layer, and
   wherein the second structure comprises a third region of the first layer.

5. The optical device of claim 4,
   wherein the second region of the first layer has a trapezoidal shape of which a width in the third direction decreases along the first direction, and
   wherein the second region of the second layer has a triangular shape of which a width in the third direction decreases along the first direction.

6. The optical device of claim 4,
   wherein a first length of the second region of the first layer in the first direction is less than a second length of the second region of the second layer in the first direction.

7. The optical device of claim 6,
   wherein the second region of the second layer is formed on a portion of the second region of the first layer and a portion of the third region of the first layer.

8. The optical device of claim 4,
   wherein the second layer comprises a groove that exposes edge portions of the top surface of the first layer and is arranged around bottom edge portions of the second layer.

9. The optical device of claim 8,
   wherein the material layer has a band-like shape that fills the groove and is arranged around bottom edge portions of side surfaces of the second layer.

10. The optical device of claim 4,
    wherein the width of the first layer is greater than the width of the second layer.

11. The optical device of claim 1,
    wherein the first and second structures comprise monocrystalline layers.

12. The optical device of claim 2,
    wherein the first structure comprises a light coupler,
    wherein the second structure comprises a light waveguide, and
    wherein the connecting structure interconnects the light coupler and the light waveguide.

13. An optical device, comprising:
    a substrate;
    a clad layer arranged in a trench in a portion of the substrate;
    an optical transfer structure, which comprises a first layer arranged on the clad layer and a second layer on a portion of the first layer, and which extends in a first direction; and
    a material layer arranged on an exposed portion of a top surface of the first layer, wherein etching selectivity of the material layer is different from etching selectivity of materials constituting the first layer and the second layer,
    wherein the first layer comprises:
       a first region of which a width in a direction perpendicular to the first direction decreases along the first direction; and
       a second region, which is connected to an end portion of the first region with the smallest width and extends and maintains the smallest width,
    wherein a width of the second layer decreases along the first direction, and
    wherein a top surface of the second layer has a triangular shape.

14. The optical device of claim 13,
wherein the second layer is arranged on a portion of the first region and a portion of the second region.

15. An optical device, comprising:
a first structure arranged on a clad layer in a trench of a substrate, the first structure extending in a first direction with a tapered width that decreases as the first structure extends along the first direction;
a second structure arranged on the first structure, the second structure extending in the first direction with a tapered width that decreases as the second structure extends along the first direction;
a connecting structure that interconnects the first structure and the second structure, wherein an optical transfer structure including the first structure, the connecting structure, and the second structure comprises a first layer and a second layer on a portion of the first layer; and
a material layer arranged on an exposed portion of a top surface of the first layer, wherein etching selectivity of the material layer is different from etching selectivity of materials constituting the first layer and the second layer,
wherein light incident on the optical device is compressed or expanded based on the tapering of the first structure and the tapering of the second structure.

16. The optical device of claim 15,
wherein the first structure has a first un-tapered section; and
wherein the second structure has a second un-tapered section on the first un-tapered section of the first structure.

17. The optical device of claim 15,
wherein the first structure has a first tapered section;
wherein the second structure has a second tapered section on the first tapered section of the first structure, and
wherein the first tapered section and second tapered section partially overlap.

18. The optical device of claim 16,
wherein the first structure has a third un-tapered section, and
wherein the first tapered section of the first structure is arranged between the first un-tapered section and the third un-tapered section in the first direction.

19. The optical device of claim 15,
wherein light incident on the optical device from a first way of the first direction is compressed, and
wherein light incident on the optical device from a second way of the first direction opposite the first way is expanded.

* * * * *